United States Patent
Tsai et al.

(10) Patent No.: US 8,254,487 B2
(45) Date of Patent: Aug. 28, 2012

(54) METHOD AND APPARATUS OF CODEBOOK-BASED SINGLE-USER CLOSED-LOOP TRANSMIT BEAMFORMING (SU-CLTB) FOR OFDM WIRELESS SYSTEMS

(75) Inventors: Jiann-An Tsai, Plano, TX (US); Cornelius Van Rensburg, Dallas, TX (US); Jianzhong Zhang, Irving, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1111 days.

(21) Appl. No.: 12/149,108

(22) Filed: Apr. 25, 2008

(65) Prior Publication Data
US 2009/0041150 A1   Feb. 12, 2009

Related U.S. Application Data

(60) Provisional application No. 60/935,384, filed on Aug. 9, 2007, provisional application No. 60/935,416, filed on Aug. 10, 2007.

(51) Int. Cl.
*H04B 7/02* (2006.01)
*H04L 1/02* (2006.01)
(52) U.S. Cl. ......... 375/267; 375/229; 375/220; 375/221
(58) Field of Classification Search ............... 375/220, 375/221, 229, 256, 259
See application file for complete search history.

(56) References Cited

U.S. PATENT DOCUMENTS

| | | | | |
|---|---|---|---|---|
| 2003/0185320 | A1* | 10/2003 | Ueno et al. | 375/347 |
| 2007/0206626 | A1* | 9/2007 | Lee et al. | 370/437 |
| 2007/0206686 | A1* | 9/2007 | Vook et al. | 375/260 |
| 2008/0292013 | A1* | 11/2008 | Varadarajan et al. | 375/260 |
| 2009/0141824 | A1* | 6/2009 | Xia et al. | 375/267 |

* cited by examiner

*Primary Examiner* — Kenneth Lam
*Assistant Examiner* — Qutbuddin Ghulamali

(57) ABSTRACT

A method includes broadcasting, at a transmitter, messages comprising antenna configuration, antenna spacing and a number of antenna of the transmitter and reference signals; generating, at a receiver, a codebook comprising a plurality of antenna beams based on the broadcasted messages; receiving, at the receiver, the broadcasted reference signals; selecting, at the receiver, an antenna beam among the plurality of antenna beams within the codebook in dependence upon a predetermined performance criteria of a data communication system and in dependence upon the broadcasted reference signals; feedbacking to the transmitter, at the receiver, information comprising the antenna beam selected by the receiver; optimizing, at the transmitter, a beamforming process by utilizing the feedback information from the receiver; transmitting, at the transmitter, data signals by utilizing the optimized beamforming process; and receiving and processing, at the receiver, the data signals in dependence upon the selected antenna beams within the codebook.

56 Claims, 28 Drawing Sheets

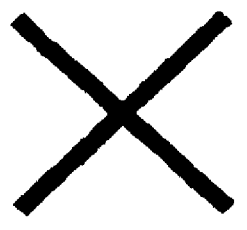
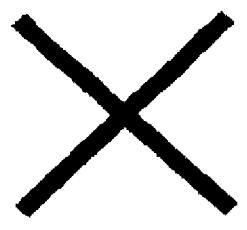
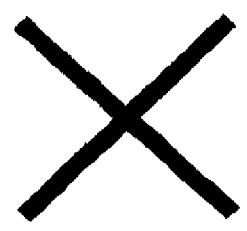
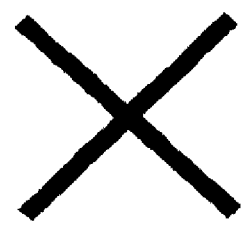
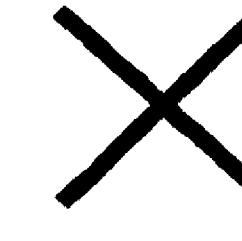
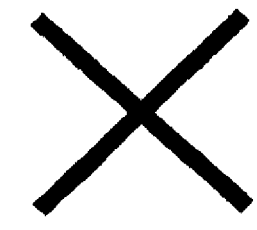
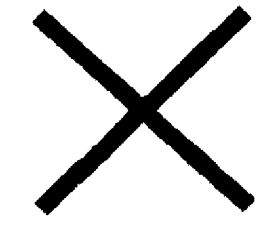
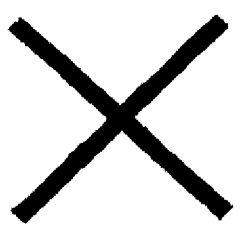
Figure 19

METHOD AND APPARATUS OF CODEBOOK-BASED SINGLE-USER CLOSED-LOOP TRANSMIT BEAMFORMING (SU-CLTB) FOR OFDM WIRELESS SYSTEMS

CLAIM OF PRIORITY

This application makes reference to, incorporates the same herein, and claims all benefits accruing under 35 U.S.C. §119 from applications earlier filed in the U.S. Patent & Trademark Office on 9 Aug. 2007 and there duly assigned Ser. No. 60/935,384, and on 10 Aug. 2007 and there duly assigned Ser. No. 60/935,416, respectively.

BACKGROUND OF THE INVENTION

1. Field of the Invention

The present invention relates to a single-user closed-loop transmit beamforming (SU-CLTB) scheme of a Multiple Input Multiple Output (MIMO) system, and more particularly, to a single-user closed-loop transmit beamforming (SU-CLTB) scheme of Multiple Input Multiple Output (MIMO) system with the transmit beamforming scheme employing a codebook.

2. Description of the Related Art

OFDM (Orthogonal Frequency Division Multiplexing) is a technology of multiplexing data in a frequency domain. Modulation symbols are carried by multiple frequency subcarriers. The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers. The advantage of OFDM (Orthogonal Frequency Division Multiplexing) over other transmission schemes is the robustness to multipath fading. The multipath fading in time domain translates into frequency selective fading in frequency domain. With the cyclic prefix or zero prefix added, the inter-symbol-interference between adjacent OFDM symbols are avoided or largely alleviated. Moreover, because each modulation symbol is carried over a narrow bandwith, the modulation symbol experiences a single path fading. Simple equalization scheme may be applied to combat frequency selection fading.

Multiple Input Multiple Output (MIMO) schemes use multiple transmitting antennas and multiple receiving antennas to improve the capacity and reliability of a wireless communication channel. A MIMO system capacity increases a function of K where K is the minimum of number of transmit antennas (M) at transmitter and receive antennas (N) at receiver, i.e. K=min(M,N). The transmitted signals are received at the four receive antennas. Spatial signal processing is performed on the received signals in order to recover the four data streams. An example of spatial signal processing is V-BLAST which uses the successive interference cancellation principle to recover the transmitted data streams. Other variants of MIMO schemes include schemes that perform some kind of space-time coding across the transmit antennas (e.g. D-BLAST) and also beamforming schemes such as SDMA (Spatial Division multiple Access). In addition, MIMO may be implemented with transmit/receive diversity scheme and transmit/receive beamforming scheme in order to improve the link reliability or system capacity in wireless communication systems. The MIMO channel estimation consists of estimating the channel gain and phase information for links from each of the transmit antennas to each of the receive antennas. Therefore, the channel for M×N MIMO system consists of an N×M matrix:

$$H = \begin{bmatrix} a_{11} & a_{12} & \ldots & a_{1M} \\ a_{21} & a_{22} & \ldots & a_{2M} \\ \vdots & \vdots & \ldots & \vdots \\ a_{N1} & a_{M2} & \ldots & a_{NM} \end{bmatrix}$$

where matrix H is the MIMO channel matrix and $a_{ij}$ represents the channel gain from transmit antenna j to receive antenna i. In order to enable the estimations of the elements of the MIMO channel matrix, separate pilots are transmitted from each of the transmit antennas.

A contemporary transmit beamforming in wireless systems may be done with either closed-loop or open-loop manners. Beamforming is a technique of signal processing performed with transmitters arrays or receivers arrays and may control the transceiving direction and sensitivity of a transceived signal. During transmitting a signal, transmit beamforming may increase a power in the direction along which the signal is to be transmitted. A transmission gain may be achieved by the transmit beamforming process comparing to an omnidirectional transmission.

Open-loop system is typically well suited for TDD (Time Division Duplexing) system. Open-loop system does not require any feedback of channel information. Therefore, less overhead is introduced in open-loop system. The disadvantage of open-loop system however is that an open-loop system needs to constantly conduct phase calibration in order to compensate the phase difference between transmission and reception RF (radio frequency) chains among multiple transmit antennas. Another disadvantage of the open-loop system is that the open-loop system requires a constant uplink phase reference such as an uplink pilot, this requirement may induce an excessive feedback overhead. The process of phase calibration is generally costly, and sensitive to radio channel environment.

Closed-loop, on the other hand, does not require phase calibration process. The closed-loop system however requires the channel feedback to the transmitters. Therefore, overhead is significantly increased in closed-loop system comparing with the open-loop system. Additionally, the closed-loop system may be sensitive to the feedback channel error due to either feedback delay or fast channel variation. Typically, FDD (Frequency Division Duplexing) employs closed-loop transmit beamforming scheme.

SUMMARY OF THE INVENTION

It is therefore one object of the present invention to provide an improved transmit beamforming scheme for wireless communication system to overcome the above stated disadvantages.

It is another object of the present invention to provide a single-user closed-loop transmit beamforming (SU-CLTB) scheme in MIMO system, with the transmit beamforming scheme employing a codebook. The codebook includes of a set of predetermined antenna beams known to mobile stations. And the set of predetermined antennas beams is formed based on the antenna array response vectors of a serving base station.

It is an embodiment of the present invention that OFDM (Orthogonal Frequency Division Multiplexing) radio signals are employed in the communication between a base station and a mobile station.

It is another embodiment of the present invention that the antenna array response vector is cell-specific, and may be carried through the broadcasting channel (BCH) in a real cellular system. The mobile station may select the best antenna beam within the codebook and feed back the best antenna beam to the mobile station's serving base station in order to improve the throughput of the system.

It is still another embodiment that the best antenna beam information is selected from the set of predetermined antenna beams in the codebook based on certain performance criteria such as maximizing Signal-to-Noise ratio (SNR).

It is still another embodiment that the performance enhancement of the proposed SU-CLTB for wireless systems may be achieved by two methods. One method is boosting the energy of the transceived signals according to the beamforming gain which results in SNR gain. The other method is reducing a radiated energy distributed to other base stations according to a narrower radiation beam pattern, which results in SIR (signal-to-interference) gain in a wireless system. The overall system enhancement of CLTB is the combination of SNR and SIR gains, which depend on the operating load of systems.

It is still another embodiment that a transmitter of the proposed codebook-based SU-CLTB system at a base station includes a transmitter processing stage and a transmit beamforming stage. The transmitter includes a CRC (cyclic redundancy check) inserter inserting a CRC to an single information block, a turbo coder or LDPC (low density parity check) coder, channel interleaver, modulator, a transmit beamforming (TB) generating the codebook, and a contemporary OFDM transmission stage.

It is still another embodiment that the codebook is adaptable in the sense that codebook design is generated based the antenna configuration, antenna spacing, and the number of antenna of its serving base station. The proposed codebook is a set of transmit beamforming vectors, $C_j$ with $\{j=1,2,\ldots J\}$, which are used to form a set of predetermined antenna beams. J is the size of codebook. A mobile station may then select the best antenna beam and feedback the best antenna beam to the serving base station in the cell in order to improve system throughput.

It is still another embodiment that, for a uniform linear array (ULA) configuration, beamforming codebook is given by:

$$c_j = \begin{bmatrix} w_1(\theta_j) \\ w_2(\theta_j) \\ \vdots \\ w_p(\theta_j) \\ \vdots \\ w_P(\theta_j) \end{bmatrix} = \begin{bmatrix} 1 \\ e^{-j2\pi \frac{D}{\lambda}\sin(\theta_j)} \\ \vdots \\ e^{-j2\pi \frac{(p-1)D}{\lambda}\sin(\theta_j)} \\ \vdots \\ e^{-j2\pi \frac{(P-1)D}{\lambda}\sin(\theta_j)} \end{bmatrix}$$

where $j=1,\ldots,J$, J is size of the codebook, p is index of transmitting antennas, i.e., $p=1,\ldots,P$, P is number of transmitting antennas, D is the space between the transmitting antennas, $\lambda=c/f\_c$ is wavelength of a carrier where c is speed of light and f_c is frequency of the carrier, $\theta_j$ is an main angle of a direction of departure of a j'th transmit antenna beam. The set of $\theta_j$ s, where $j=1,\ldots,J$, is specified and known to the serving base station and all of the mobile stations within the cell.

It is still another embodiment that the set of $\theta_j$ s, $j=1,\ldots,J$, is a set where all antenna beams have uniform angular spacing. In particular, in a three-sector system where each sector has 120 degrees angular spacing, the set $\theta_j$ s, $j=1,\ldots,J$, is given by $$\theta_j = \left(j+\frac{1}{2}\right) \times \frac{120}{J} \text{ (degrees)},$$

when the reference angle, i.e., zero-degree corresponds to the section edge; or $$\theta_j = \left(j+\frac{1}{2}\right) \times \frac{120}{J} - 60 \text{ (degrees)},$$

when the reference angle, i.e., zero-degree corresponds to the center of the sector.

It is still another embodiment that, for a uniform linear array (ULA), the set of $\theta_j$ s, $j=1,\ldots,J$, is a set where the antenna beams do not have uniform equal angular spacing.

It is still another embodiment that, for a uniform circular array (UCA), the beamforming codebook is given by:

$$c_j = \begin{bmatrix} w_1(\theta_j) \\ w_2(\theta_j) \\ \vdots \\ w_p(\theta_j) \\ \vdots \\ w_P(\theta_j) \end{bmatrix} = \begin{bmatrix} e^{-j2\pi \frac{R}{\lambda}\sin(\zeta)\cos(\theta_j - \varphi_1)} \\ e^{-j2\pi \frac{R}{\lambda}\sin(\zeta)\cos(\theta_j - \varphi_2)} \\ \vdots \\ e^{-j2\pi \frac{R}{\lambda}\sin(\zeta)\cos(\theta_j - \varphi_p)} \\ \vdots \\ e^{-j2\pi \frac{R}{\lambda}\sin(\zeta)\cos(\theta_j - \varphi_P)} \end{bmatrix}$$

for $j=1,\ldots,J$. Here R is the circular radius of the antenna array, $\zeta$ is the elevation angle, $\theta_j$ is the main angle of the direction of departure of the j'th transmit antenna beam at a base station. For simplicity, only azimuth angles are considered in the propagation geometry (i.e., $\zeta=90$ degrees) but the results may be generalized to three dimensions.

It is still another embodiment that, the set of $\theta_j$ s, $j=1,\ldots,J$, is a set where all of the antenna beams have a uniform angular spacing. In particular, in a three-sector system where each sector has 120 degrees angular spacing, the set $\theta_j$ s, $j=1,\ldots,J$, is given by $$\theta_j = \left(j+\frac{1}{2}\right) \times \frac{120}{J} \text{ (degrees)},$$

when a reference angle, i.e., zero-degree direction, corresponds to the edge of a sector; or $$\theta_j = \left(j+\frac{1}{2}\right) \times \frac{120}{J} - 60 \text{ (degrees)},$$

when the reference angle, i.e., zero-degree direction, corresponds to the center of the sector. Here, three-sector system is a system having 120-degree angular spacing per sector, and the 120-degree angular spacing is angular coverage of a base station.

It is still another embodiment that the uniform linear array may be deployed in sectorized cell, while the uniform circular array may be probably used in an omni-directional cell.

It is still another embodiment that the codebook employs a space between antennas equal to half of the wavelength.

It is still another embodiment that, for a uniform circular array (UCA), the set of $\theta_j$ s, j=1, ..., J, is a set where the beams do not uniform equal angular spacing.

It is still another embodiment that, for a uniform linear array (ULA) of single polarization antenna, a first set of common reference signals are sequentially mapped to a set of antennas and the set of antennas are neighboring to each other (i.e., mapping type A); or the first set of common reference signals are mapped to discrete antennas with at least one antenna of a free state located in between except for the 1st antenna and the last antenna in the linear array (i.e., mapping type B).

It is still another embodiment that, for a uniform circular array (UCA) of single polarization antenna, the first set of common reference signals are mapped to a set of discrete antennas disposed either perpendicular to or overlapped with the diameter of the circle (i.e., mapping type A); the first set of common reference signals are mapped to a set of discrete antennas positioned with a 45 degrees angle against the diameter of the uniform circular array (i.e., mapping type B).

It is still another embodiment that, for a uniform linear array (ULA) of dual slat ±45degree polarization antenna, the first set of common reference signals are mapped to the antennas positioned with 45 degrees against a virtual vertical line in a clockwise direction (i.e., mapping type A); or the first set of common reference signals are mapped to the antennas positioned with 45 degrees against the virtual vertical line in a counter clockwise direction (i.e., mapping type B).

It is still another embodiment that, for a uniform linear array (ULA) of dual vertical/horizontal polarization antenna, the first set of common reference signals are mapped to the antennas positioned aligned with the virtual vertical line (i.e., mapping type A); or the first set of common reference signals are mapped to the antennas positioned perpendicularly to the virtual vertical line (i.e., mapping type B).

It is still another embodiment that, for a uniform circular array (UCA) of dual slat ±45 degree polarization, the first set of common reference signals are mapped to the antennas positioned with 45 degrees against the virtual vertical line in a clockwise direction (i.e., mapping type A); or the first set of common reference signals are mapped to the antennas positioned with 45 degrees against the virtual vertical line in a counter clockwise direction (i.e., mapping type B).

It is still another embodiment that, for a uniform circular array (UCA) of dual vertical/horizontal polarization, the first set of common reference signals are mapped to the antennas positioned aligned with the virtual vertical line (i.e., mapping type A); or the first set of common reference signals are mapped to the antennas positioned perpendicularly to the virtual vertical line (i.e., mapping type B).

It is still another embodiment that a second set of common reference signals sent at a much lower frequency comparing to the first set of common reference signals and are mapped to the transmitting antennas which are not associated with the first set of common reference signals.

It is still another embodiment that, for the uniform linear array (ULA) of single polarization antenna, the first set of common reference signals are sequentially mapped to a set of antennas and the set of antennas are neighboring to each other, and the second set of common reference signals are sequentially mapped to another set of antennas and the another antennas are neighboring to each other (i.e., mapping type A); or, the first set of common reference signals are mapped to discrete antennas with at least one antenna mapped to one of the second set of common reference signals in between except for the first antenna and last antenna in the line, and the second set of the common reference signals are mapped to discrete antennas with at least one antenna mapped with one of the first set of the common reference signals in between except for the first antenna and the last antenna in the linear array(i.e., mapping type B);.

It is still another embodiment that, for the UCA of single polarization antenna, the first set of the common reference signals are sequentially mapped to a set of neighboring antennas and the second set of the common reference signals are mapped to another set of neighboring antennas (i.e., mapping type A); or, one of the first set of the common reference signals and one of the second set of the common reference signals are alternately mapped to individual antenna arrange at the periphery of UCA (i.e., mapping type B).

It is still another embodiment that, for the uniform circular array (UCA) of dual vertical/horizontal polarization, the first set of the common reference signals are mapped to neighboring sets of antennas, and the second set of the common reference signals are mapped to other neighboring sets of antennas with each set of antennas having two antennas across each other (i.e., mapping type A); or, one of the first set of the common reference signals and one of the second set of the common reference signals are mapped to two antennas across each other respectively (i.e., mapping type B).

It is still another embodiment that, for the uniform linear array (ULA) of dual slat ±45 degree polarization, the first set of the common reference signals are mapped to neighboring sets of antennas, and the second set of the common reference signals are mapped to other neighboring sets of antennas (i.e., mapping type A); or, one of the first set of the common reference signals and one of the second set of the common reference signals are mapped to two antennas across each other respectively (i.e., mapping type B).

It is still another embodiment that the best antenna beam information is selected from the set of pre-determined antenna beam based on certain performance criteria maximum signal-to-noise ration (MSNR) or Minimum Mean Square Error (MMSE). In the case of noise-dominant environment, MSNR is used; and in the presence of interference dominant environment, MMSE is employed.

It is still another embodiment that, when MSNR is employed, the transmit beamforming vector of the best antenna beam for the k'th subcarrier, $W_k$, may be selected by, for mapping type A of mapping the common reference signals:

$$W_k = C_{j,max}$$

where $$C_{j,max} = \arg\max_j \left\{ \sum_k \sum_{m=1}^{M} \sum_{p=1}^{\frac{P}{2}} w_p(\theta_j) \hat{H}_{p,m,k} \right\},$$

where $\hat{H}_{p,m,k}$ denotes the channel estimate for transmit antenna p, receive antenna m in the k'th subcarrier, and $w_p(\theta_j)$ is vectors of codeword of the codebook and is selected according to the configuration of transmitting antennas.

It is still another embodiment that, when MSNR is employed, the transmit beamforming vector of the best antenna beam for the k'th subcarrier, $W_k$, may be selected by, for mapping type B of mapping the common reference signals:

$$W_k = C_{j,max}$$

where $$C_{j,max} = \arg\max_{j}\left\{\sum_{k}\sum_{m=1}^{M}\sum_{p=1}^{\frac{P}{2}} w_{2p-1}(\theta_j)\hat{H}_{p,m,k}\right\},$$

where $\hat{H}_{p,m,k}$ denotes the channel estimate for transmit antenna p, receive antenna m in the k'th subcarrier, and $w_p(\theta_j)$ is vectors of codeword of the codebook and is selected according to the configuration of transmitting antennas.

It is still another embodiment that, the mobile station feedbacks only one choice of beamforming codeword of the codebook for the entire bandwidth.

It is still another embodiment that, signals of layers higher than a Physical layer are employed to transmit the feedback information of the choice of beamforming codeword of the codebook.

It is still another embodiment that, a difference between CQI (channel quality indication) calculated by dedicated signals and CQI calculated by common reference signals is reported to the base station by the mobile station. In addition, the rate of feedback to the base station for two types of CQI reporting is different. The CQI calculated by dedicated signals is typically faster than the CQI calculated by the common reference signals.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 19 is an illustration showing an example of common reference signals (RS) mapping for an eight-antenna dual slat ±45 degree polarization ULA systems with additional common reference signals constructed according to the principles of the present invention;

DETAILED DESCRIPTION OF THE INVENTION

A contemporary transmit beamforming in wireless systems may be done with either closed-loop or open-loop manners. Beamforming is a technique of signal processing performed with arrays of transmitters or receivers and may control the transceiving direction and sensitivity of a transceived signal. During transmitting a signal, transmit beamforming may increase a power in the direction along which the signal is to be transmitted. A transmission gain may be achieved by the transmit beamforming process comparing to an omnidirectional transmission.

Open-loop system is typically well suited for TDD (Time Division Duplexing) system. Open-loop system does not require any feedback of channel information. Therefore, less overhead is introduced in open-loop system. The disadvantage of open-loop system however is that an open-loop system needs to constantly conduct phase calibration in order to compensate the phase difference between transmission and reception RF (radio frequency) chains among multiple transmit antennas. Another disadvantage of the open-loop system is that the open-loop system requires a constant uplink phase reference such as an uplink pilot, this requirement may induce an excessive feedback overhead. The process of phase calibration is generally costly, and sensitive to radio channel environment.

Closed-loop, on the other hand, does not require phase calibration process. The closed-loop system however requires the channel feedback to the transmitters. Therefore, overhead is significantly increased in closed-loop system comparing with the open-loop system. Additionally, the closed-loop system may be sensitive to the feedback channel error due to either feedback delay or fast channel variation. Typically, FDD (Frequency Division Duplexing) employs closed-loop transmit beamforming scheme.

Therefore, it is necessary to provide an improved wireless communication system to overcome the above stated disadvantages.

Figure 1:
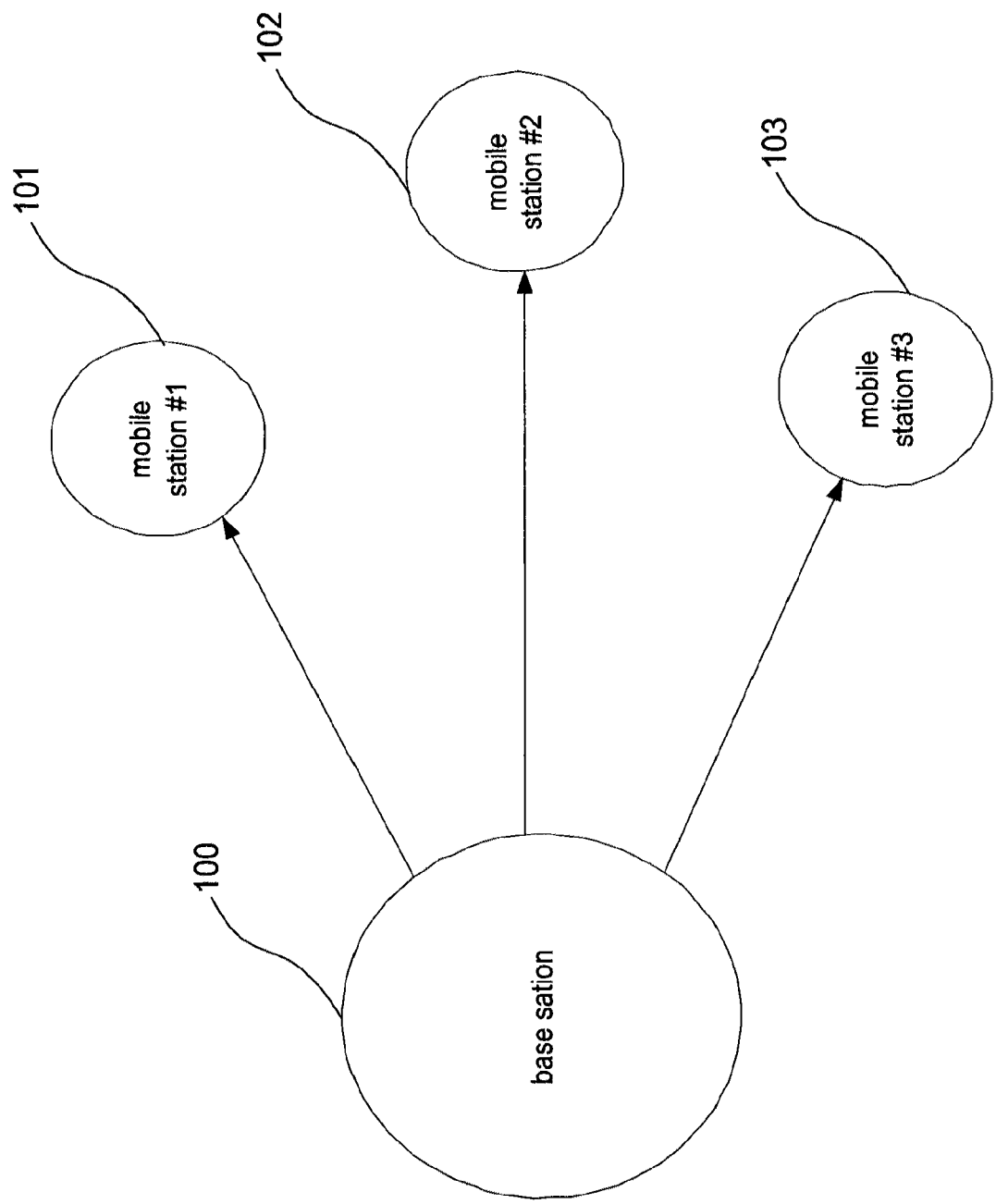
FIG. 1 is a diagram showing an example of communication system constructed according to the principles of the present invention.

FIG. 1 is a diagram showing an example of communication system constructed according to the principles of the present invention. A base station 100 is communicated with multiple of mobile stations (i.e., mobile station #1 101, mobile station #2 102, mobile station #3 103) in a wireless communication, and this wireless communication system is known as downlink communication. Base station 100 and mobile stations 101, 102 and 103 employ multiple antennas for both of transmission and reception of radio wave signals. The radio wave signal may be Orthogonal Frequency Division Multiplexing (OFDM) signals. The mobile stations may be PDAs, laptops, and/or other portable devices.

Orthogonal Frequency Division Multiplexing (OFDM) and Multiple Input Multiple Output (MIMO) will be described in details as follows.

OFDM (Orthogonal Frequency Division Multiplexing)

Figure 2:
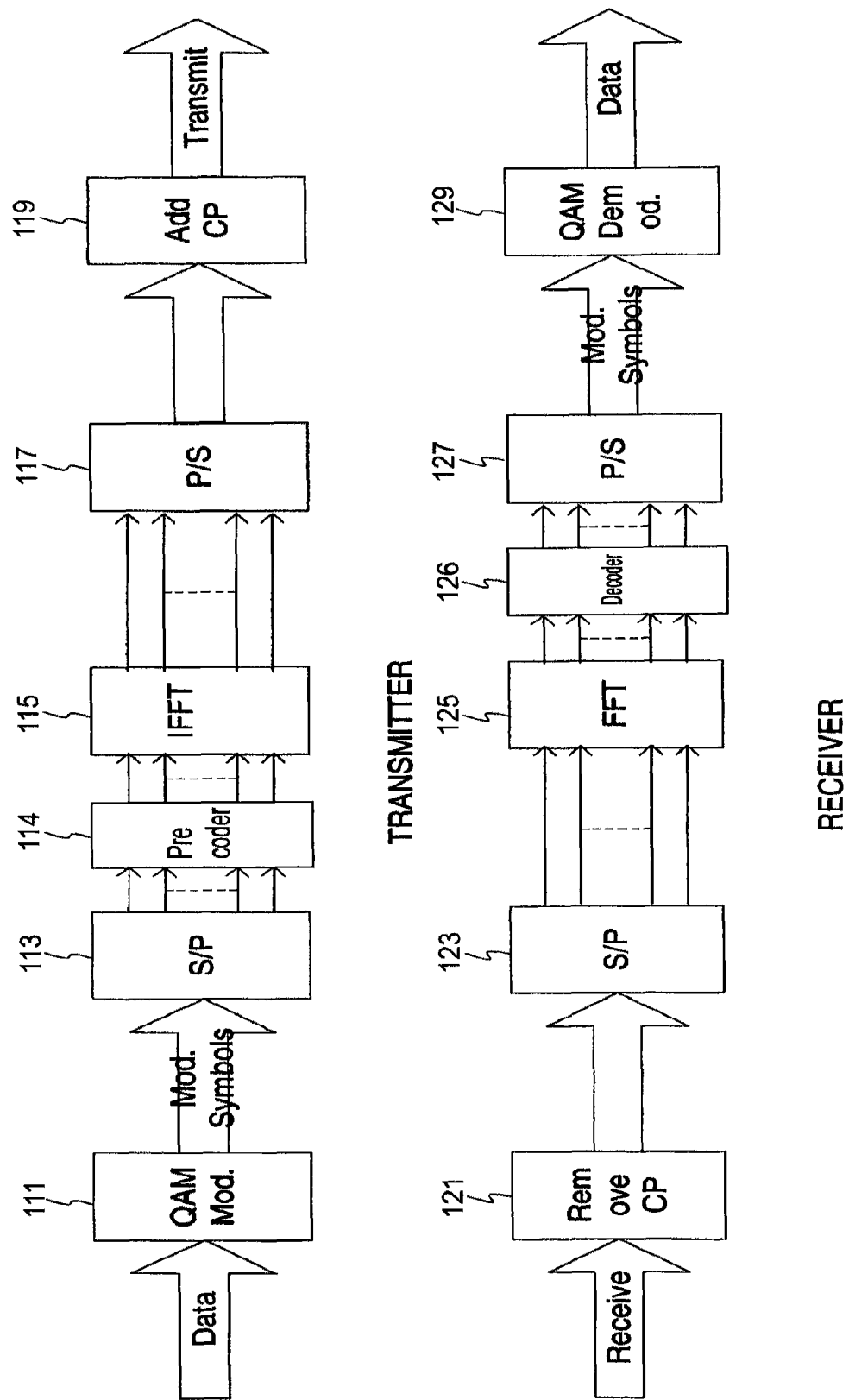
FIG. 2 is a diagram showing an example of data transmission and reception by using OFDM (Orthogonal Frequency Division Multiplexing)

OFDM is a technology of multiplexing data in a frequency domain. Modulation symbols are carried by frequency subcarriers. FIG. 2 shows a simpilifed example of data transmission and reception by using OFDM (Orthogonal Frequency Division Multiplexing). The data to be transmitted is modulated by a quadrature amplitude modulation (QAM) modulator 111. The QAM modulated symbols are serial-to-parallel converted by a serial-to-parallel convertor 113 and input to an inverse fast Fourier transform (IFFT) unit 115. The serial-to-parallel converted modulated symbols are precoded by a precoder encoder 114. At the output of IFFT unit 115, N time-domain samples are obtained. Here N refers to the sampling number of IFFT/FFT used by the OFDM system. The signal from IFFT unit 115 is parallel-to-serial converted by a parallel-to-serial convertor 117 and a cyclic prefix (CP) 119 is added to the signal sequence. The resulting sequence of samples is referred to as OFDM symbol. At the receiver, the cyclic prefix 121 is first removed and the signal is serial-to-parallel converted by parallel-to-serial convertor 123 before feeding the converted parallel signal into fast Fourier transform (FFT) transformer 125. The precoded modulated symbols are recovered by a precoder decoder 126. Output of precoder decoder 126 is parallel-to-serial converted by parallel-to-serial convertor 127 and the resulting output is input to the QAM demodulator 129. At the output of IFFT 115, N time-domain samples are obtained. Here N refers to the IFFT/FFT size used by the OFDM system. CP is added to each OFDM symbol to avoid or mitigate the impact due to multi-path fading at stage 119. The resulting sequence of samples is referred to as OFDM symbol. At the receiver side, assuming perfect time and frequency synchronization are achieved, the receiver first removes the CP and the signal is serial-to-parallel converted before feeding it into FFT 125. The output of FFT 125 is parallel-to-serial converted and the resulting QAM modulation symbols are input to QAM demodulator 129.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Figure 3:
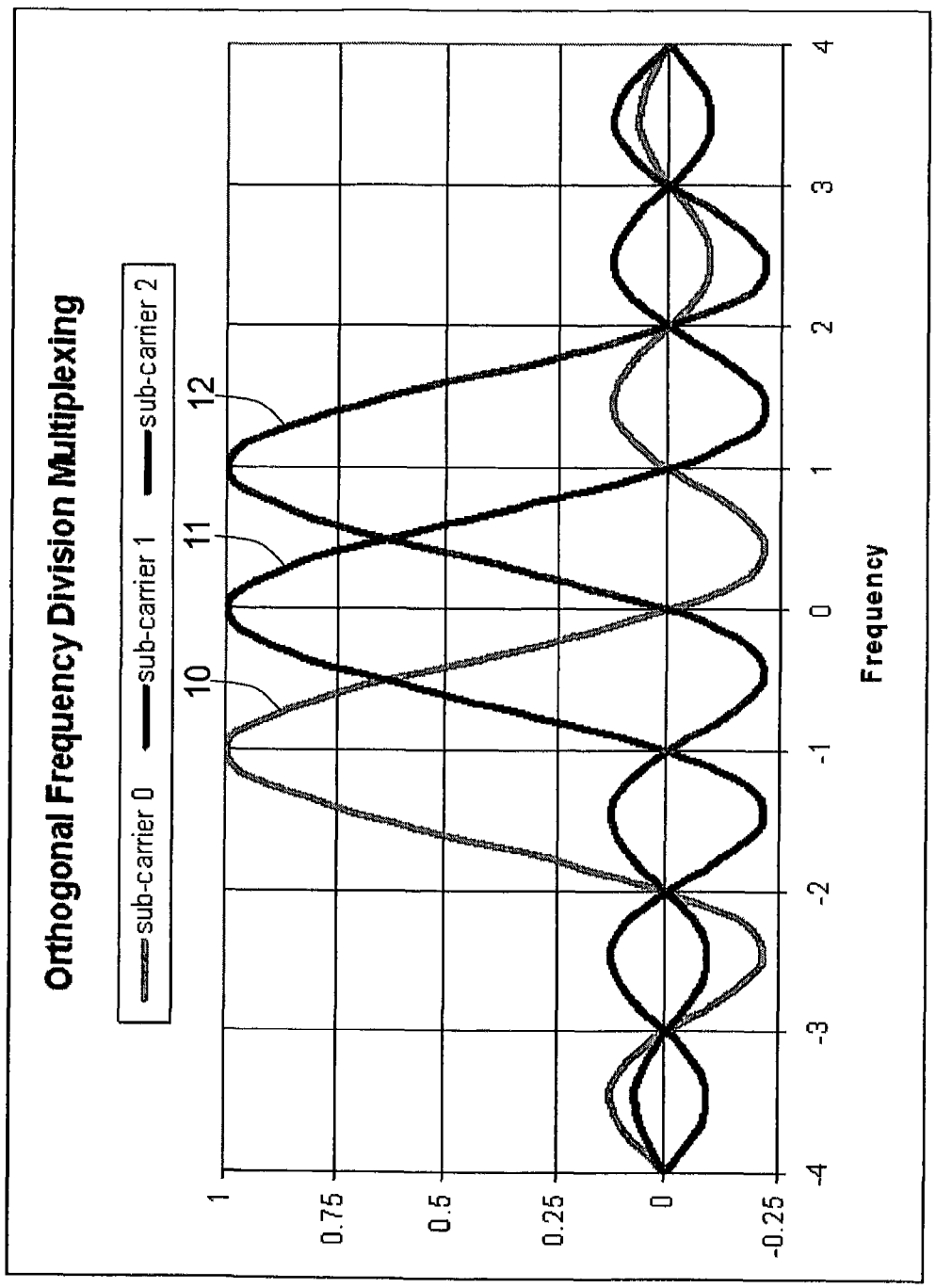
FIG. 3 is a two dimensional diagram illustrating an Orthogonal Frequency Division Multiplexing (OFDM) symbol in frequency domain.

Because each OFDM symbol has finite duration in time domain, the sub-carriers overlap with each other in frequency domain. The orthogonality however is maintained at the sampling frequency assuming the transmitter and receiver has perfect frequency synchronization, as shown in FIG. 3. FIG. 3 is an illustration of an Orthogonal Frequency Division Multiplexing (OFDM) symbol in frequency domain. Sub-carrier0 10, sub-carrier1 11 and sub-carrier2 12 overlap with each other in frequency domain. sub-carrier0 10, sub-carrier1 11 and sub-carrier2 12 have almost indentical or similar wave shapes. These three sub-carriers are mathematically perpendicular to each other, in other words, the inner products of any two of the sub-carriers are zero. In the case of frequency offset due to imperfect frequency synchronization or high mobility, the orthogonality of the sub-carriers at sampling frequencies is destroyed, resulting in inter-carrier-interference (ICI).

Figure 4:
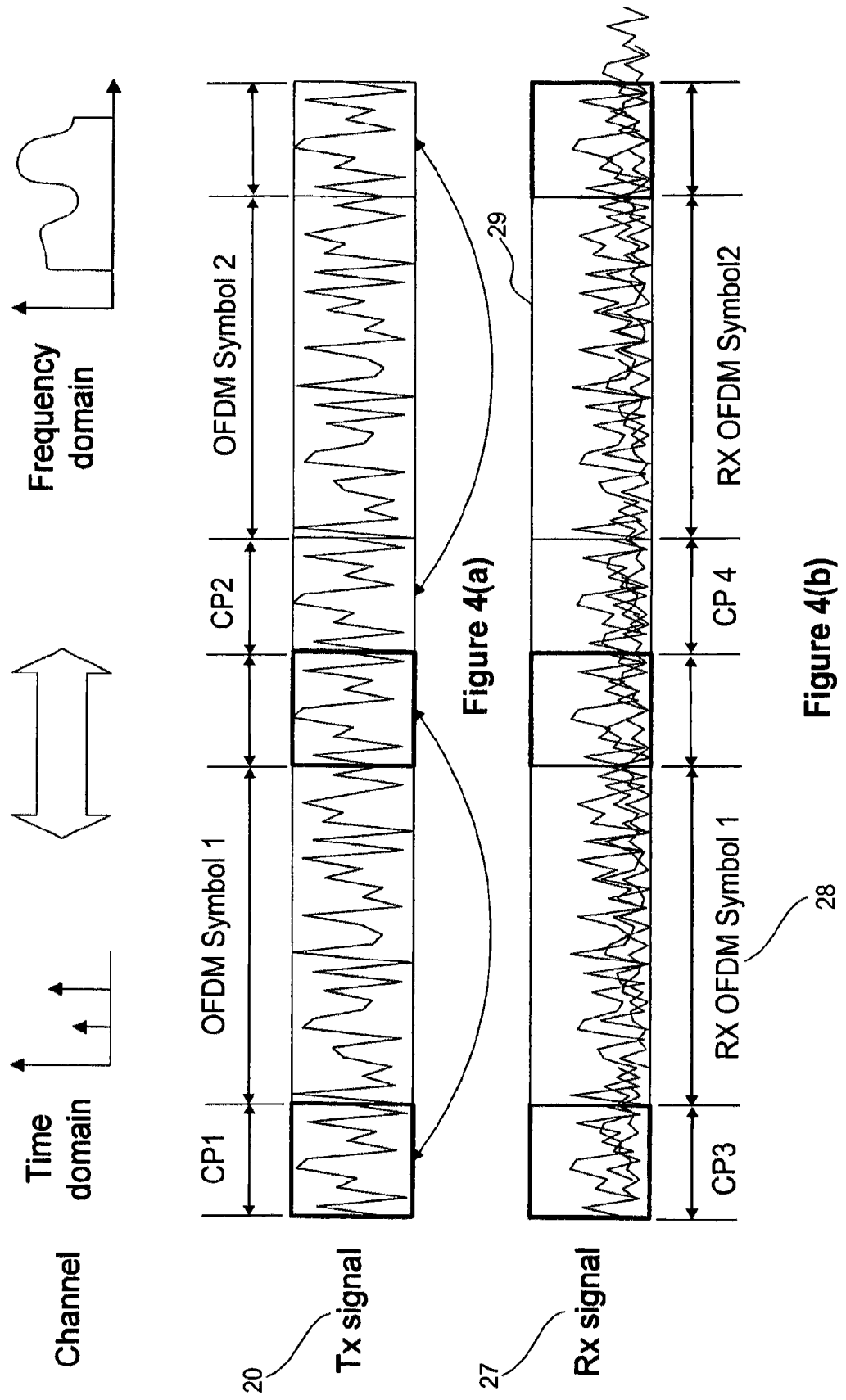
FIG. 4a is a diagram showing a transmitted OFDM symbol in time domain.
FIG. 4b is a diagram showing a received OFDM symbols in time domain.

A time domain illustration of the transmitted and received OFDM symbol is shown in FIG. 4a and 4b. FIG. 4a is an illustration of a transmitted OFDM symbol in time domain, and FIG. 4b is an illustration of the received OFDM symbols in time domain. Transmit signal 20 has continously transmitted OFDM symbols (i.e. OFDM Symbol 1, OFDM Symbol 2, . . . ), and cylic prefix (CP) portions (i.e. CP1 and CP2) are located between any of two OFDM Symbols. After transmitted through multipath fading channel 122, receive signal 27 has continously CP inserted OFDM symbols (i.e. Rx OFDM Symbol1 28, Rx OFDM Symbol2 29, . . . ). Rx OFDM Symbol1 28 and Rx OFDM Symbol2 29 are corrupted by their own CP, respectively. For example, CP3 corrupts into Rx OFDM Symbol1 28. Because of multipath fading between the transmitter and receiver, the CP portion of the received signal is often corrupted by the previous OFDM symbol. As long as the CP is sufficiently long, the received OFDM symbol without CP should only contain its own signal convoluted by the multipath fading channel. In general, a Fast Fourier Transform (FFT) is taken at the receiver side to allow further processing frequency domain. The advantage of OFDM over other transmission schemes is the robustness to multipath fading. The multipath fading in time domain translates into frequency selective fading in frequency domain. With the cyclic prefix or zero prefix added, the inter-symbol-interference between adjacent OFDM symbols are avoided or largely alleviated. Moreover, because each modulation symbol is carried over a narrow bandwidth, the modulation symbol experiences a single path fading. Simple equalization scheme may be applied to combat frequency selection fading.

MIMO (Multiple Input Multiple Output)

Figure 5:
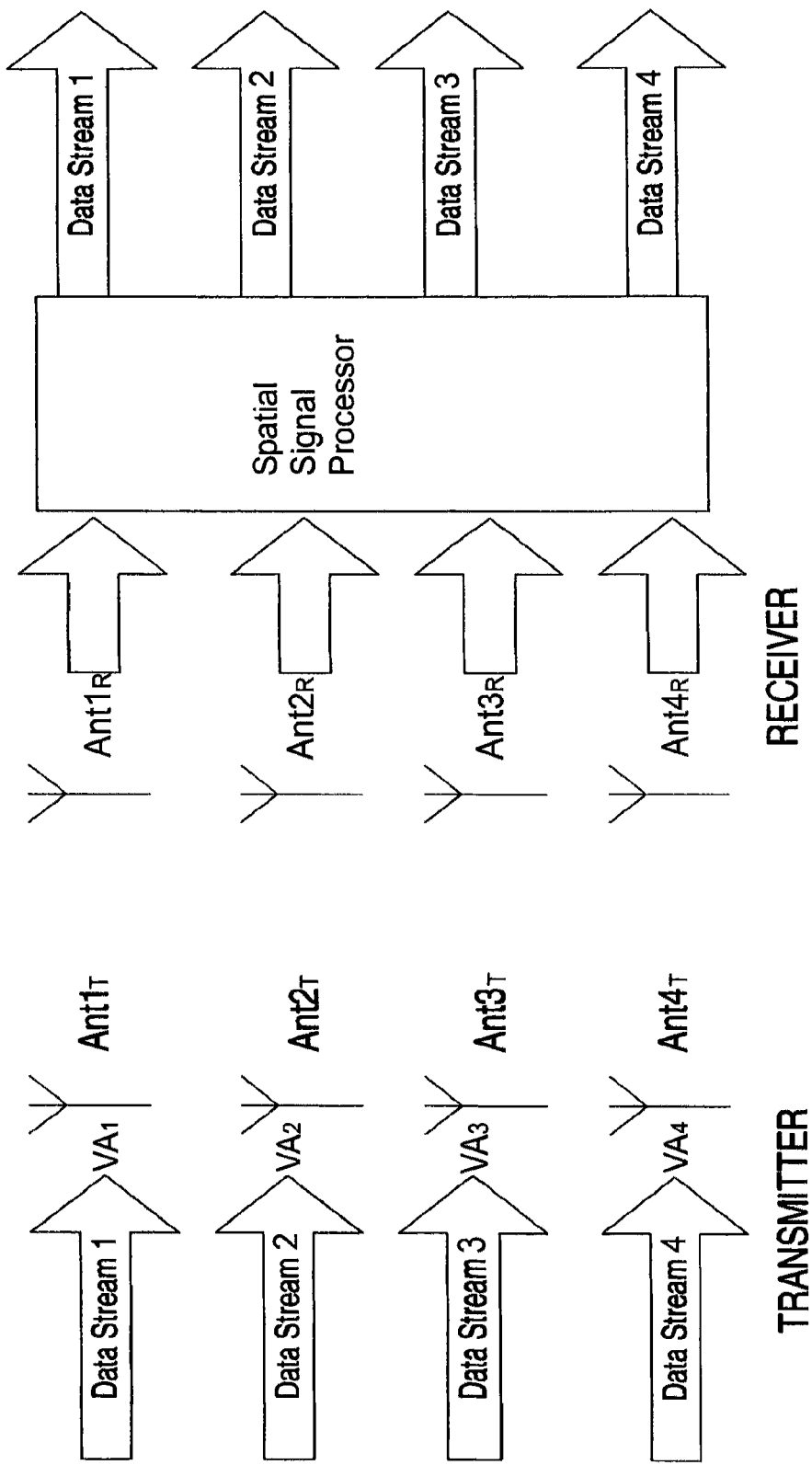
FIG. 5 is a diagram showing a simplified example of a 4×4 MIMO (multiple input multiple output) system.

Multiple Input Multiple Output (MIMO) schemes use multiple transmit antennas and multiple receive antennas to improve the capacity and reliability of a wireless communication channel. A MIMO system capacity increases a function of K where K is the minimum of number of transmit antennas (M) at transmitter and receive antennas (N) at receiver, i.e. K=min(M,N). A simplified example of a 4×4 MIMO system is shown in FIG. 5. In this example, four different data streams Data Streams 1 to 4 are transmitted separately from the four transmit antennas $Ant1_T$ to $Ant4_T$. The transmitted signals are received at the four receive antennas $Ant1_R$ to $Ant4_R$. Spatial signal processing is performed on the received signals in order to recover the four data streams. An example of spatial signal processing is V-BLAST which uses the successive interference cancellation principle to recover the transmitted data streams. Other variants of MIMO schemes include schemes that perform some kind of space-time coding across the transmit antennas (e.g. D-BLAST) and also beamforming schemes such as SDMA (Spatial Division multiple Access). In addition, MIMO may be implemented with transmit/receive diversity scheme and transmit/receive beamforming scheme in order to improve the link reliability or system capacity in wireless communication systems.

The MIMO channel estimation consists of estimating the channel gain and phase information for links from each of the transmit antennas to each of the receive antennas. Therefore, the channel for M×N MIMO system consists of an N×M matrix:

$$H = \begin{bmatrix} a_{11} & a_{12} & \cdots & a_{1M} \\ a_{21} & a_{22} & \cdots & a_{2M} \\ \vdots & \vdots & \cdots & \vdots \\ a_{N1} & a_{M2} & \cdots & a_{NM} \end{bmatrix} \quad (1)$$

where H is the MIMO channel matrix and arepresents the channel gain from transmit antenna j to receive antenna i. In order to enable the estimations of the elements of the MIMO channel matrix, separate pilots are transmitted from each of the transmit antennas.

The different embodiments of the present invention will be described in details as follow.

Proposed Single-User Closed-Loop Transmit Beamforming (SU-CLTB)

The contemporary principle of OFDM waveform and MIMO system in wireless communication has been previously described. The following specification will concern the principle of the proposed single-user closed-loop transmit beamforming (SU-CLTB) scheme of MIMO system. Specifically, the case where a base station employs transmit beamforming and is communicated with a single mobile station at a time through the usage of OFDM radio signal will be considered. The proposed SU-CLTB scheme employs a codebook, and the codebook consists of a set of predetermined antenna beams known to mobile stations. The set of predetermined antennas beams is formed based on the antenna array response vectors of a serving base station, which is a function of antenna spacing, angle of arrival, and antenna configuration (for example, uniform linear array or uniform circular array). The base station and all mobile stations are included in a cell. The antenna array response vector is cell-specific, and may be carried through the broadcasting channel (BCH) in a real cellular system. A mobile station may then select the best antenna beam within the codebook and feed back the best antenna beam to the mobile station's serving base station in order to improve the throughput of the system. The best antenna beam information is selected from the set of predetermined antenna beams in the codebook based on certain performance criteria such as maximizing Signal-to-Noise ratio (SNR). The performance enhancement of the proposed SU-CLTB for wireless systems may be achieved by two methods. One method is boosting the energy of the transceived signals according to the beamforming gain, which results in SNR gain. The other method is reducing a radiated energy distributed to other base stations according to a narrower radiation beam pattern, which results in SIR (signal-to-interference) gain in a wireless system. The overall system enhancement of CLTB is the combination of SNR and SIR gains, which depend on the operating load of systems. For instance, in a lightly loaded system (or coverage-limited system), SNR gain is dominant; while in a heavy-loaded system (or interference-limited system) SIR gain is dominant.

Figure 6:
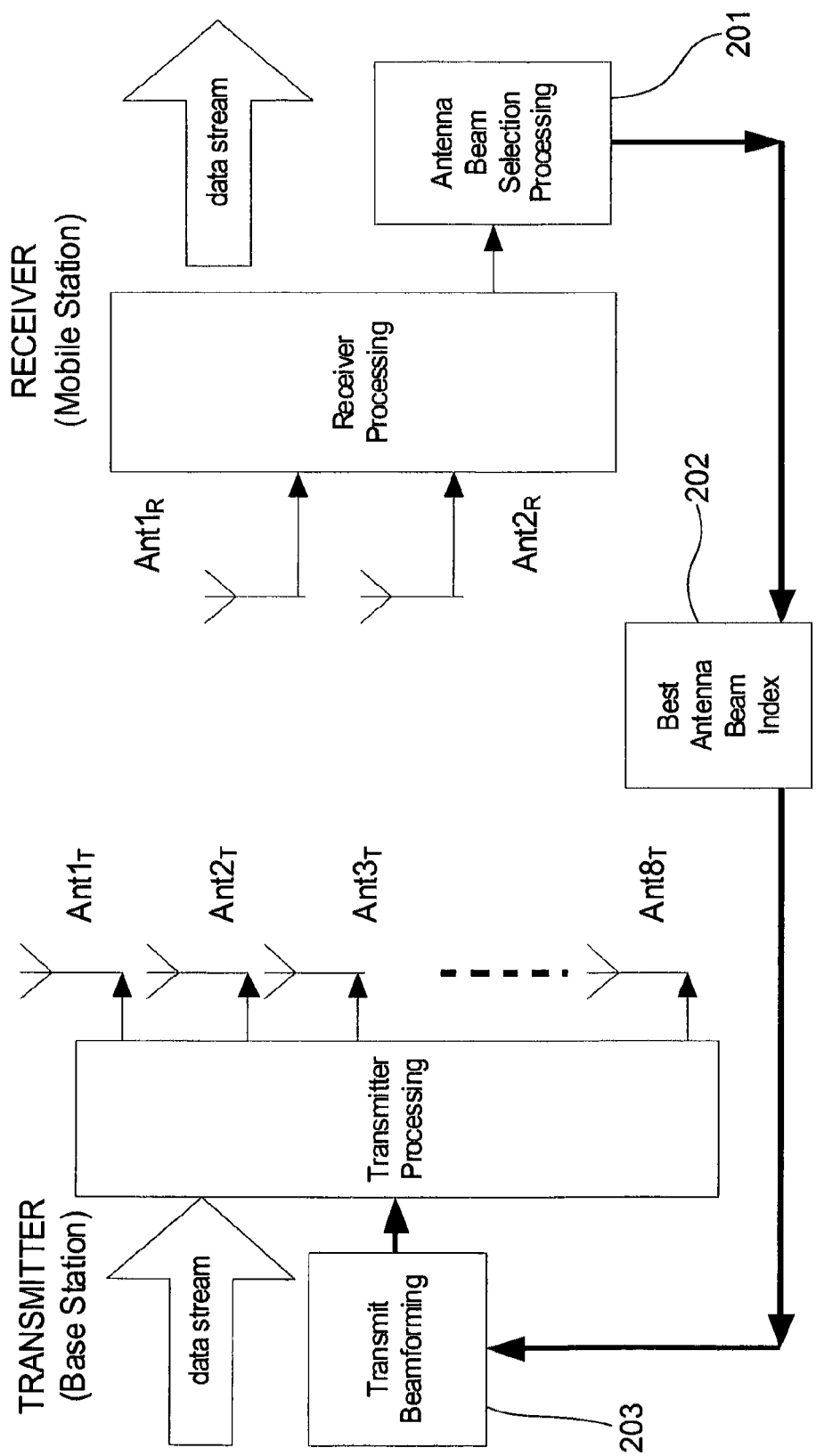
FIG. 6 is a diagram showing an example of system level description for the codebook-based SU-CLTB constructed according to the principles of the present invention.

An example of system level description for the proposed codebook-based SU-CLTB is shown in FIG. 6. As shown in FIG. 6, data stream is input into transmitter at base station, is processed by the transmitter and then is transmitted by transmitting antennas $Ant1_T$-$Ant8_T$. a The base station employs transmit beamforming stage 203. In the present invention, a codebook containing a set of predetermined antenna beams known to mobile stations is employed in the transmit beamforming stage. Receiving antennas $Ant1_R$ and $Ant2_R$ receive the signals transmitted from the transmitter. The receiver of the proposed codebook-based SU-CLTB system at a mobile station has an antenna beam selection processing stage 201, which is used to determine best antenna beam 202 among the predetermined antenna beams in the codebook, based on certain performance such as maximum signal-to-noise ration (MSNR) or Minimum Mean Square Error (MMSE). Best antenna beam information 202 is then feed backed to a serving base station for transmit beamforming stage 203. The detail of code-book design, codebook generation, antenna beam selection algorithm, signaling scheme, and reference signal (RS) mapping for various antenna configurations is described as follows.

Figure 7:
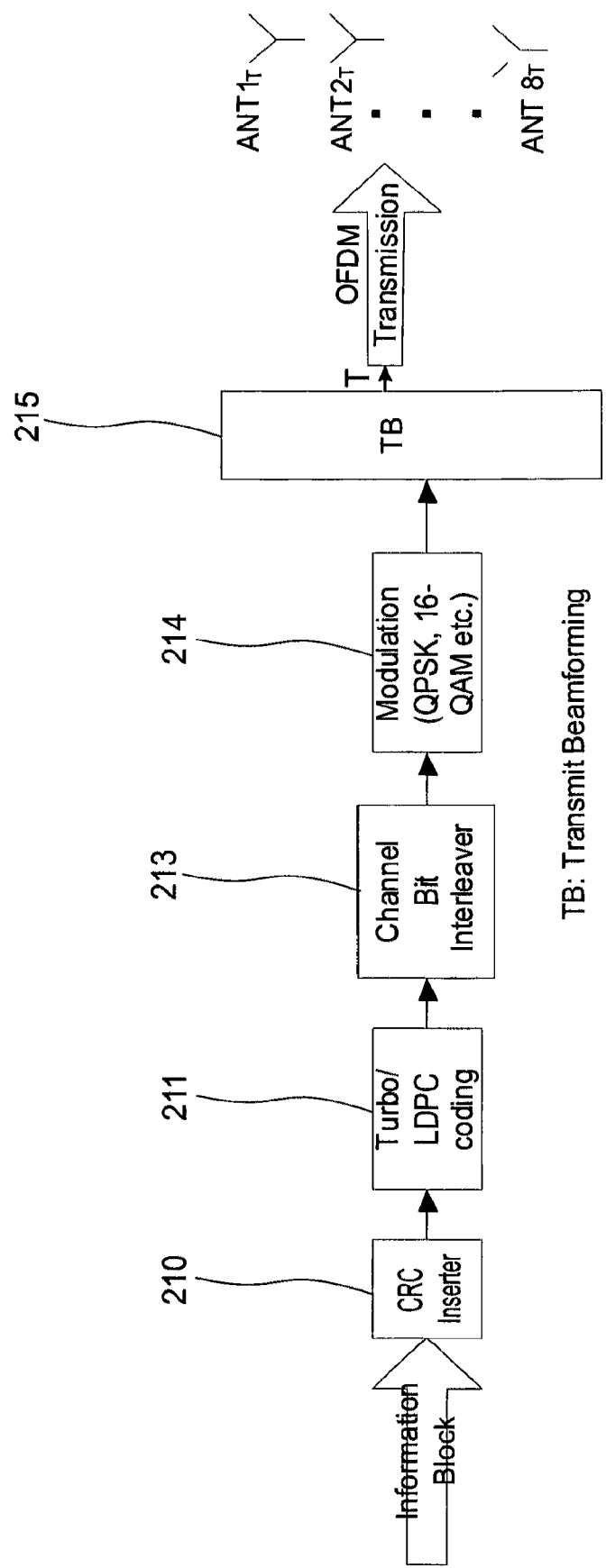
FIG. 7 is a diagram showing an example of transmitter processing of a single-codeword OFDM transmission scheme constructed according to the principles of the present invention.

As shown in FIG. 6, the transmitter of the proposed codebook-based SU-CLTB system at a base station includes a transmitter processing stage and a transmit beamforming stage. An example of transmitter processing is single-codeword OFDM transmission scheme as shown in FIG. 7. A CRC inserter 210 adds a CRC (cyclic redundancy check) to an single information block and then either turbo coding or LDPC (low density parity check) coding stage 211, channel inter-leaving stage 213, and modulation stage 214 are performed sequentially. A turbo encoder is formed by parallel concatenation of two recursive systematic convolutional (RSC) encoders separated by an interleaver. After transmit beamforming (TB) stage 215, only one predetermined antenna beam T is generated in this example. A contemporary OFDM transmission as show in FIG. 2 is implemented after the transmit beamforming stage 215.

Figure 8:
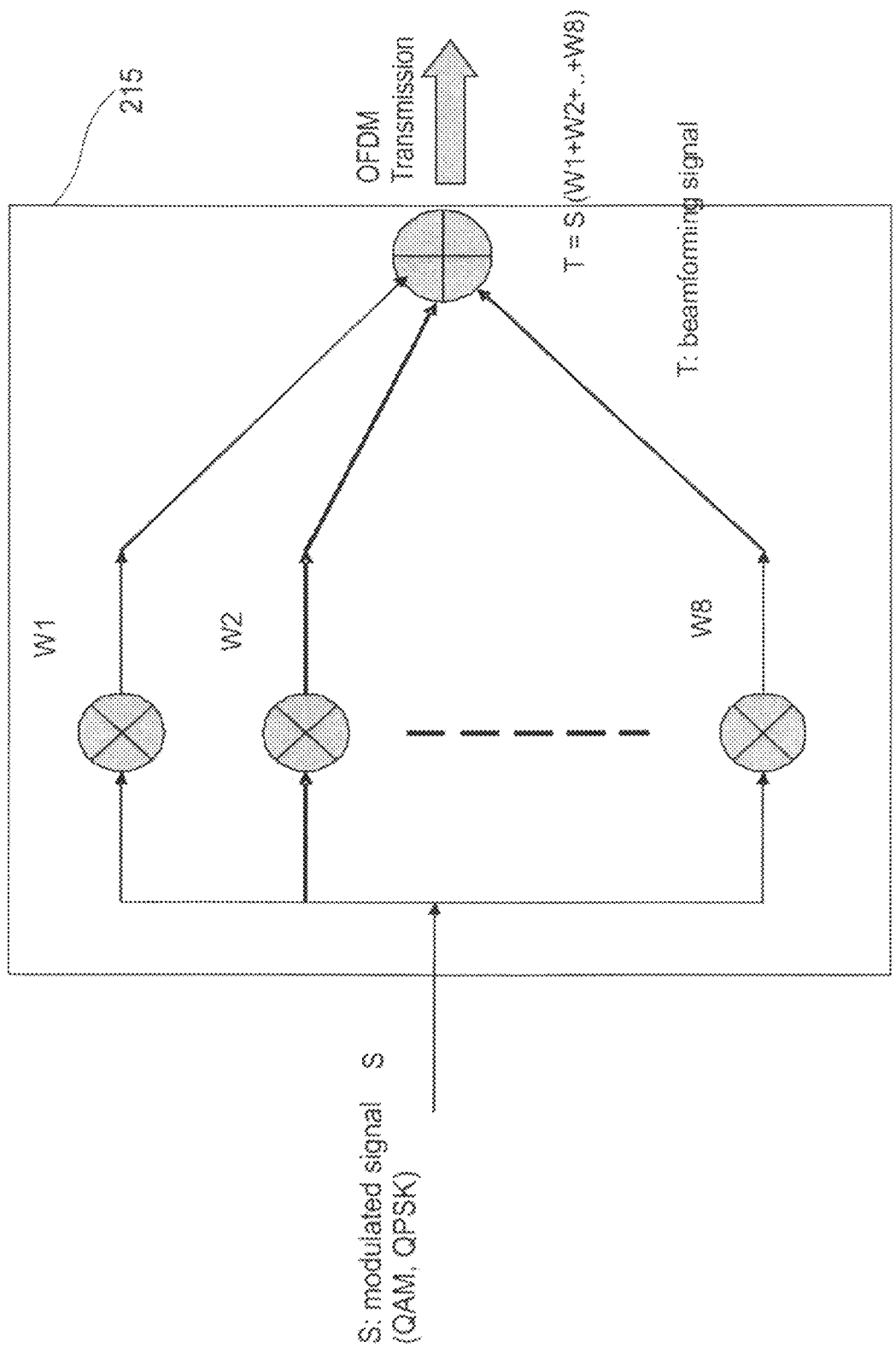
FIG. 8 is an illustration showing a codebook-based transmit beamforming constructed according to the principles of the present invention.

A detailed codebook-based transmit beamforming processing 215 is shown in FIG. 8. Beamforming signal T is the sum of the signals weighted by W1, W2, ..., W8 for Ant1$_T$1, Ant2$_T$, ... and Ant8$_T$, respectively. W1, W2, ..., W8 are called beamforming weights, which are derived from codebook. T is a transmit signal after beamforming (i.e., beamformed transmit signal) and [W1, W2, ..., W8] is a codeword of the codebook. W1-W8] are vectors of each codeword W of the codebook. The details of codebook design and code generation will be described in next section.

Codebook Design and Codebook Generation for SU-CLTB

In this section, a codebook design is proposed. The proposed codebook is not fixed, but adaptable in the sense that codebook design is optimized for each cell including the base station and its corresponding mobile stations. That is, the codebook is cell-specific, and is generated based the antenna configuration, antenna spacing, and the number of antenna of its serving base station. The proposed codebook is a set of transmit beamforming vectors, $C_j$ with $\{j=1,2,\ldots J\}$, which are used to form a set of predetermined antenna beams. J is the size of codebook or the number of transmit beam vectors. A mobile station may then select the best antenna beam and feedback the best antenna beam to the serving base station in the cell in order to improve system throughput. $C_j$ is formed by the antenna array response vector of a serving base station, which is function of antenna spacing, angle of arrival, antenna configuration (uniform linear array, uniform circular array), and antenna polarization.

In one embodiment of the invention, for a uniform linear array (ULA), the proposed beamforming codebook is given by:

$$c_j = \begin{bmatrix} w_1(\theta_j) \\ w_2(\theta_j) \\ \vdots \\ w_p(\theta_j) \\ \vdots \\ w_P(\theta_j) \end{bmatrix} = \begin{bmatrix} 1 \\ e^{-j2\pi \frac{D}{\lambda} sin(\theta_j)} \\ \vdots \\ e^{-j2\pi \frac{(p-1)D}{\lambda} sin(\theta_j)} \\ \vdots \\ e^{-j2\pi \frac{(P-1)D}{\lambda} sin(\theta_j)} \end{bmatrix} \quad (2)$$

where $j=1, \ldots, J$, J is size of the codebook, p is index of transmitting antennas, i.e., $p=1, \ldots, P$, P is number of transmitting antennas, D is the space between the transmitting antennas, $\lambda=c/f\_c$ is wavelength of a carrier where c is speed of light and f_c is frequency of the carrier, $\theta_j$ is the main angle of the direction of departure of a j'th transmit antenna beam. The set of $\theta_j$ s, where $j=1,\ldots,J$, is specified and known to the serving base station and all of the mobile stations within the cell. Each codeword can form an antenna beam with multiple antennas for a given carrier. A codebook is a collection of the codewords. That is, a codeword is a vector, in which each element is a weight that applies to one of antennas in the antenna array.

One example of the set of $\theta_j$ s, $j=1,\ldots,J$, is a set where all antenna beams have uniform angular spacing. In particular, in a three-sector system where each sector has 120 degrees angular spacing, the set $\theta_j$ s, $j=1, \ldots, J$, is given by $$\theta_j = \left(j+\frac{1}{2}\right) \times \frac{120}{J} \text{ (degrees)} \quad (3)$$

when the reference angle, i.e, zero-degree corresponds to the edge of a sector, or $$\theta_j = \left(j+\frac{1}{2}\right) \times \frac{120}{J} - 60 \text{ (degrees)} \quad (4)$$

when the reference angle, i.e., zero-degree corresponds to the center of the sector.

Another example of the set of $\theta_j$ s, $j=1,\ldots,J$, is a set where the antenna beams do not have uniform equal angular spacing. This is useful when the base station has prior knowledge of the geographical locations of the mobile stations, and may add more beam granularity in directions where a large concentration of mobile stations exists, while reducing beam granularity in directions where less amount of mobile stations exists.

In another embodiment of the present invention, for a uniform circular array (UCA), the proposed beamforming codebook is given by:

$$C_j = \begin{bmatrix} w_1(\theta_j) \\ w_2(\theta_j) \\ \vdots \\ w_p(\theta_j) \\ \vdots \\ w_P(\theta_j) \end{bmatrix} = \begin{bmatrix} e^{-j2\pi \frac{R}{\lambda} sin(\zeta)cos(\theta_j - \varphi_1)} \\ e^{-j2\pi \frac{R}{\lambda} sin(\zeta)cos(\theta_j - \varphi_2)} \\ \vdots \\ e^{-j2\pi \frac{R}{\lambda} sin(\zeta)cos(\theta_j - \varphi_p)} \\ \vdots \\ e^{-j2\pi \frac{R}{\lambda} sin(\zeta)cos(\theta_j - \varphi_P)} \end{bmatrix}, \quad (5)$$

where $j=1, \ldots, J$, R is a radius of uniform circular array, $\zeta$ is an elevation angle which is an angle of z-axis perpendicular to x-y plane ranging from $-90$ degree to $+90$ degrees, $\theta_j$ is the main angle of the direction of departure of the j'th transmitting antenna beam, $\phi$ is an angle of x-y plane, ranging from 0 degree to 360 degrees, and $w_p(\theta_j)$ is vectors of the codeword of the codebook. For simplicity, only azimuth angles are considered in the propagation geometry (i.e., $\zeta=90$ degrees) but the results may be generalized to three dimensions.

It is noted that the antenna array response vector $C_{j\_}\{j=1, 2,\ldots J\}$ is cell-specific, which may be carried out through the broadcasting channel (BCH) in the implementation of a real cellular wireless system. "$C_{j\_}\{j=1,2,\ldots J\}$" here is a codeword index for jth transmit antenna beam. The proposed codebook-base design assures that the codebook design is optimized for each cell-site since in a real deployment of the antenna configuration among adjacent cell-sites maybe quite different. In practical application, uniform linear array is likely to be deployed in sectorized cell, while uniform circular array is probably used in an omni-directional cell. To mitigate the effect of antenna sidelobes due large antenna spacing, the proposed codebook $C_j$ uses a closed antenna spacing equal to half of the wavelength. Similar to the ULA case, here $\theta_j$ is main angle of direction of departure of the j'th transmit antenna beam at a base station. The set of $\theta_j$s, j=1, ..., J, is specified and known at both the serving base station and all mobile stations in the cell. One example of the set of $\theta_j$ s, j=1, ..., J, is a set where all beams have uniform angular spacing. In particular, in a three-sector system where each sector has 120 degrees angular spacing, the set $\theta_j$ s, j=1, ..., J, is given by $$\theta_j = \left(j + \frac{1}{2}\right) \times \frac{120}{J} \text{ (degrees)} \tag{6}$$

when the reference angle, i.e., zero-degree direction, corresponds to the section edge, or $$\theta_j = \left(j + \frac{1}{2}\right) \times \frac{120}{J} - 60 \text{ (degrees)} \tag{7}$$

if the reference angle, i.e., zero-degree direction, corresponds to the center of the sector.

Another example of the set of $\theta_j$ s, j=1, ..., J, is a set where the beams do not uniform equal angular spacing. This is useful if the base station has the prior knowledge of the geographical locations of the mobile stations, and may add more beam granularity in directions where there are a large concentration of mobile stations, while reducing beam granularity in directions where there are less amount of mobile stations.

RS Mapping Antenna Configuration

Figure 9:
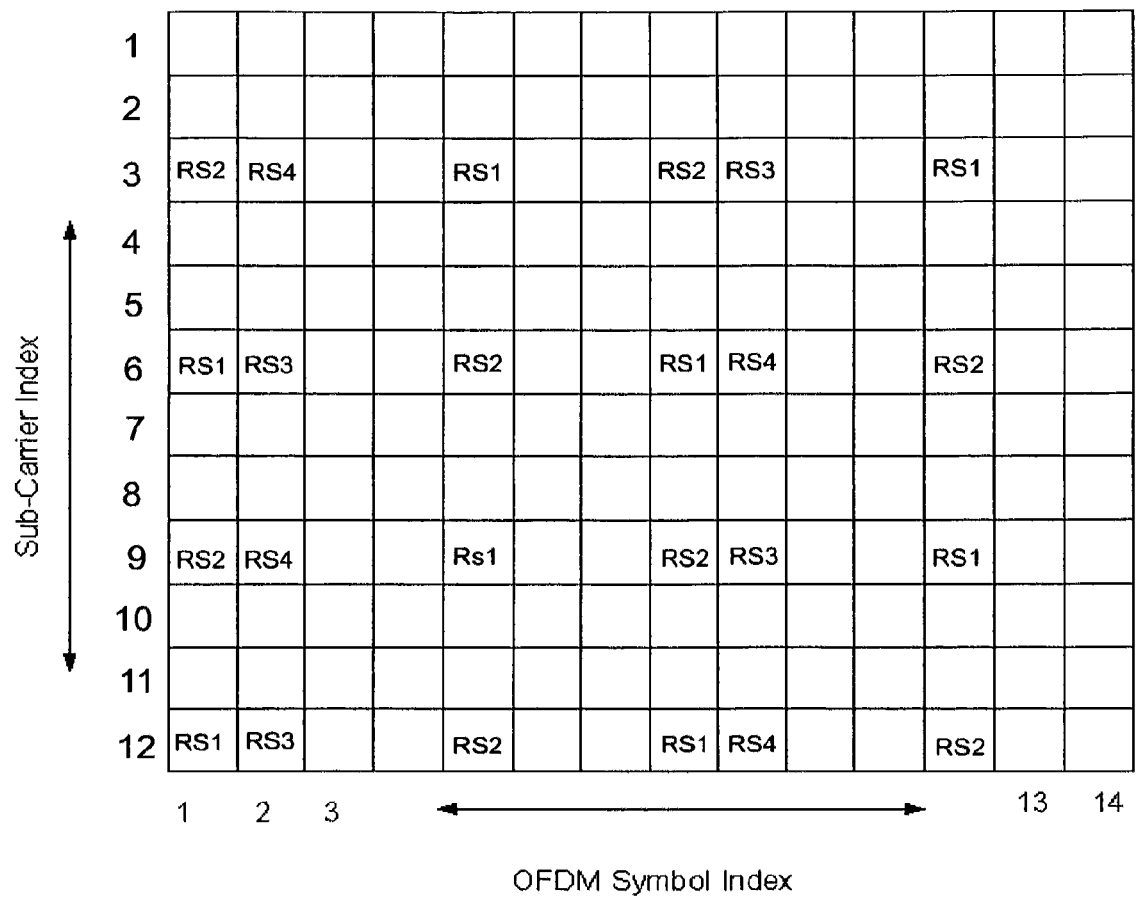
FIG. 9 is a diagram showing common reference signals (RS) being distributed in a two dimensional space formed by OFDM symbol index and sub-carrier index.

Two types of reference signals for transmit beamforming systems are typically needed in wireless communication systems: common reference signals and dedicated reference signals. Common reference signals are shared by multiple mobile stations. It is used for many purposes such as channel estimation, cell search, and so on. Dedicated reference signal is used for data demodulation for a specific mobile station. In this section, the common reference signals (RS) mapping to antenna ports for various antenna configurations will be discussed. Example of RS1, RS2, RS3, and RS4 structure is shown in FIG. 9. Note that RS1, RS2, RS3, and RS4 are common RS signals for antenna 1, antenna 2, antenna 3 and antenna 4, respectively. The four kinds of common RS are distributed in a predetermined order in the two dimensional space of OFDM symbol index and sub-carrier index.

FIGS. 10-15 show examples of RS mapping for an eight-antenna system and each figure contains examples of two alternative RS mapping, i.e., type A and type B. All of the antennas indicated in FIGS. 10-15 refer to transmitting antennas. Each RS is mapped to a corresponding antenna with a predetermined rule.

Figure 10:
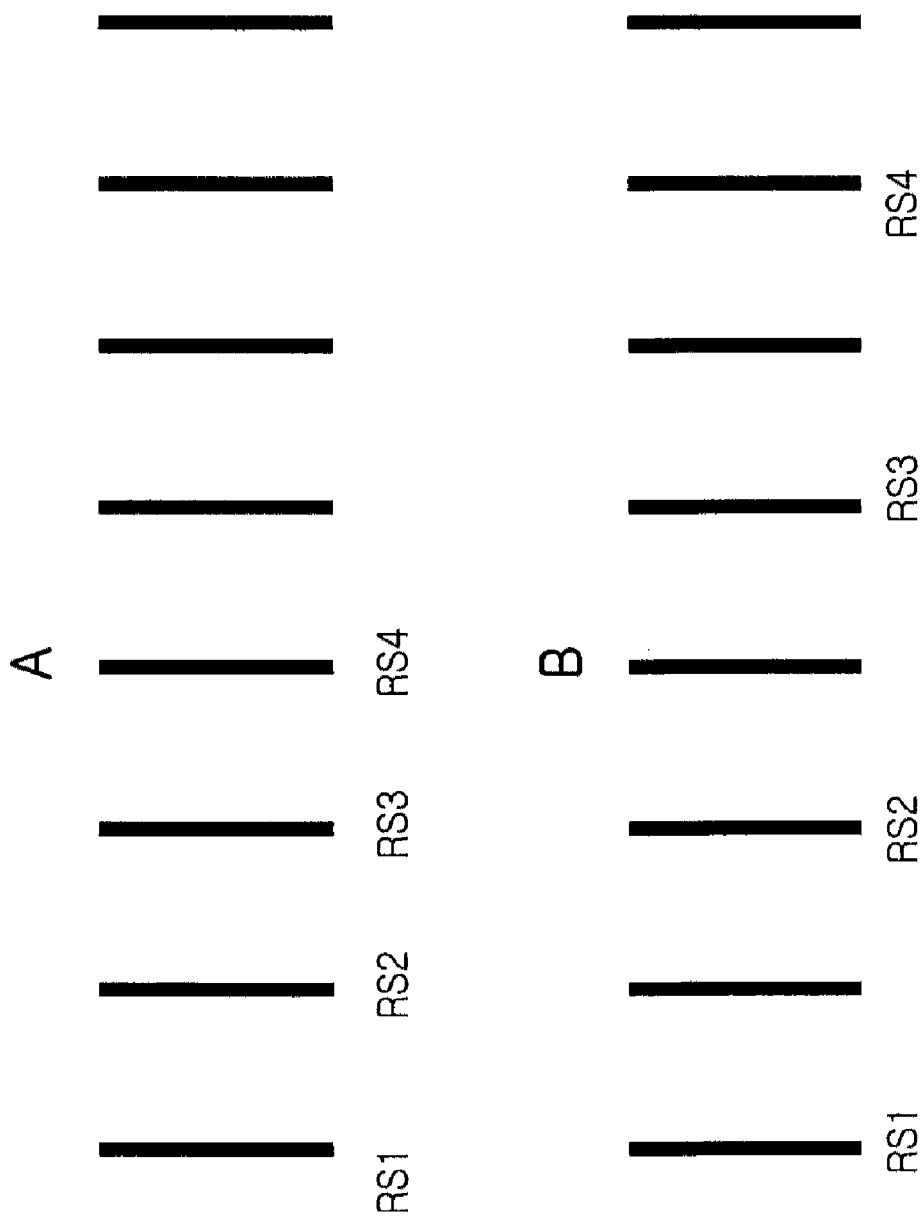
FIG. 10 is an illustration showing an example of common reference signals (RS) mapping for an eight-antenna uniform linear array (ULA) with single antenna polarization constructed according to the principles of the present invention.
Figure 11:
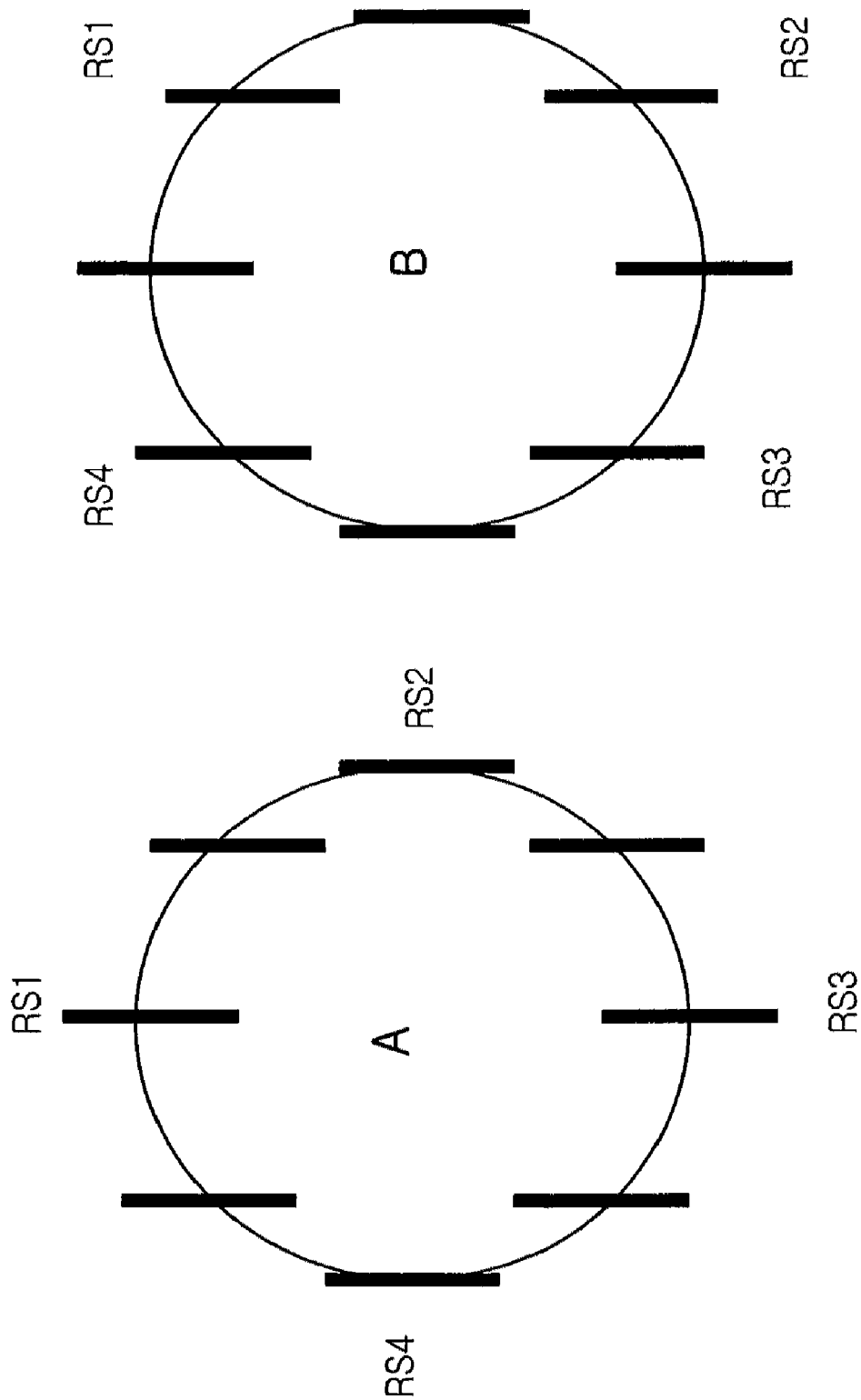
FIG. 11 is an illustration showing an example of common reference signals (RS) mapping for an eight-antenna uniform circular array (UCA) with single antenna polarization constructed according to the principles of the present invention.

For single polarization antenna, examples are shown in FIGS. 10 and 11.

FIG. 10 shows the example of RS mapping for eight-antenna uniform linear array. Antennas have one common direction in a uniform linear array and are allocated linearly. For type A RS mapping, RS1 is mapped to ANT1(antenna 1), RS2 is mapped to ANT2, RS3 is mapped to ANT3, RS4 is mapped to ANT4. For type B RS mapping, RS1 is mapped to ANT1(antenna 1), RS 2 is mapped to ANT3, RS3 is mapped to ANT5, RS 4 is mapped to ANT7. An example of type A RS mapping may be represented as follows:
RS1⇔ANT1;
RS2⇔ANT2;
RS3⇔ANT3; and
RS4⇔ANT4.

An example of type B RS mapping may be represented as follows:
RS1⇔ANT1;
RS2⇔ANT3;
RS3⇔ANT5; and
RS4⇔ANT7.

The mapping type A represents a case where RSs are sequentially mapped to a set of antennas and the set of antennas are neighboring to each other; mapping type B represents a case where RSs are mapped to discrete antennas with at least one antenna of a free state located in between except for the 1st antenna and the last antenna.

FIG. 11 shows the example of RS mapping for eight-antenna uniform circular array. Antennas have one common direction in a uniform linear array and are evenly located at the periphery of a circle having a predetermined radius. Two of the antennas are overlapped with the diameter of the circle and two of the antennas are perpendicular to the diameter of the circle. Each of the rest four antennas is positioned with a 45 degrees angle against the diameter of the circle. In FIG. 11, RSs are mapped to discrete antennas with at least one antenna of a free state located in between for both of mapping type A and type B. The mapping type A represents a case where RSs are mapped to a set of discrete antennas disposed either perpendicular to or overlapped with the diameter of the circle; mapping type B represents a case where RSs are mapped to a set of discrete antennas positioned with a 45 degrees angle against the diameter of the circle.

For dual polarization antenna, two types of antennas are considered: dual slat ±45 degree polarization and dual vertical/horizontal polarization. The eight antennas are arranged into four sets with each set having two antennas crossing each other. Examples are shown in FIGS. 12-15.

Figure 12:
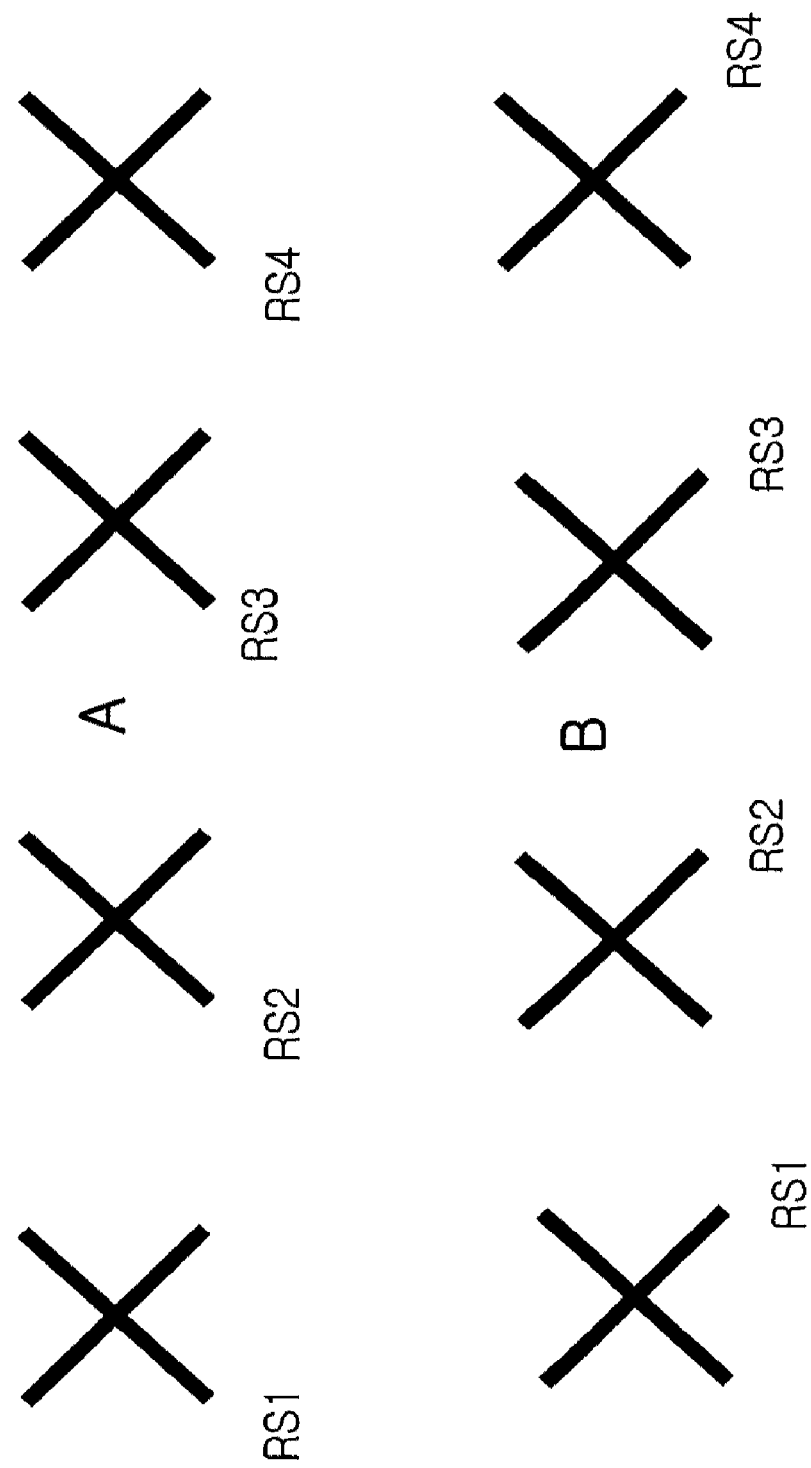
FIG. 12 is an illustration showing an example of common reference signals (RS) mapping for an eight-antenna uniform linear array with dual slat ±45 degree polarization constructed according to the principles of the present invention.

FIG. 12 shows the example of RS mapping for eight-antenna uniform linear array with dual slat ±45 degree polarization. Two antennas across each other in one set are positioned with 45 degrees against a virtual vertical line in a clockwise direction and with −45 degrees against the virtual vertical line in a counter-clockwise direction respectively. The mapping type A maps RSs to the antennas positioned with 45 degrees against a virtual vertical line in a clockwise direction while the mapping type B maps RSs to the antennas positioned with 45 degrees against a virtual vertical line in a counter clockwise direction.

Figure 13:
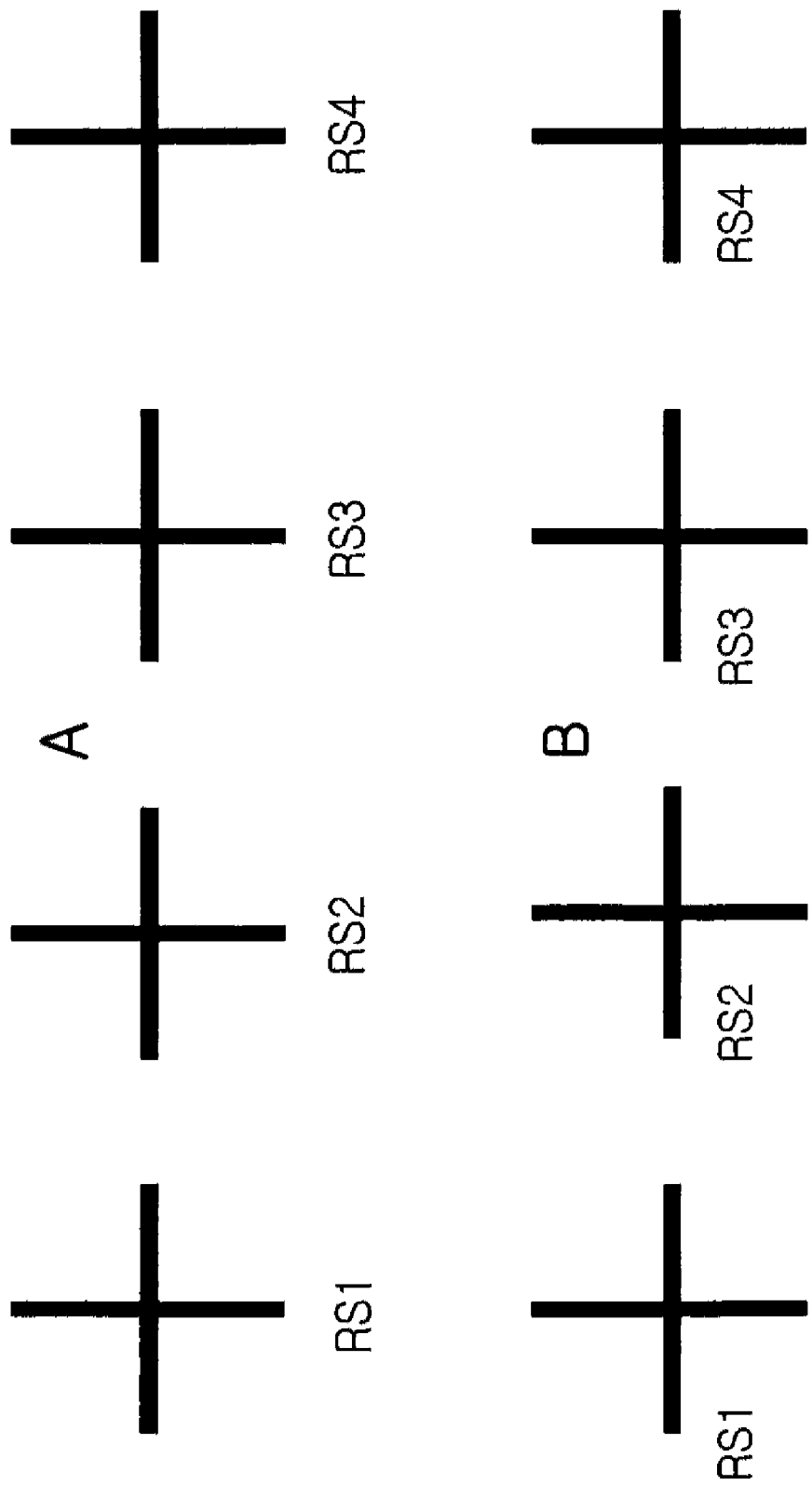
FIG. 13 is an illustration showing an example of common reference signals (RS) mapping for an eight-antenna uniform linear array with dual vertical/horizontal polarization constructed according to the principles of the present invention.

FIG. 13 shows the example of RS mapping for eight-antenna uniform linear array with dual vertical/horizontal polarization. Antennas across each other in one set are positioned perpendicular to a virtual vertical line in a clockwise direction and aligned with the virtual vertical line respectively. The mapping type A maps RSs to the antennas positioned aligned with the virtual vertical line while the mapping type B maps RSs to the antennas positioned perpendicularly to the virtual vertical line.

Figure 14:
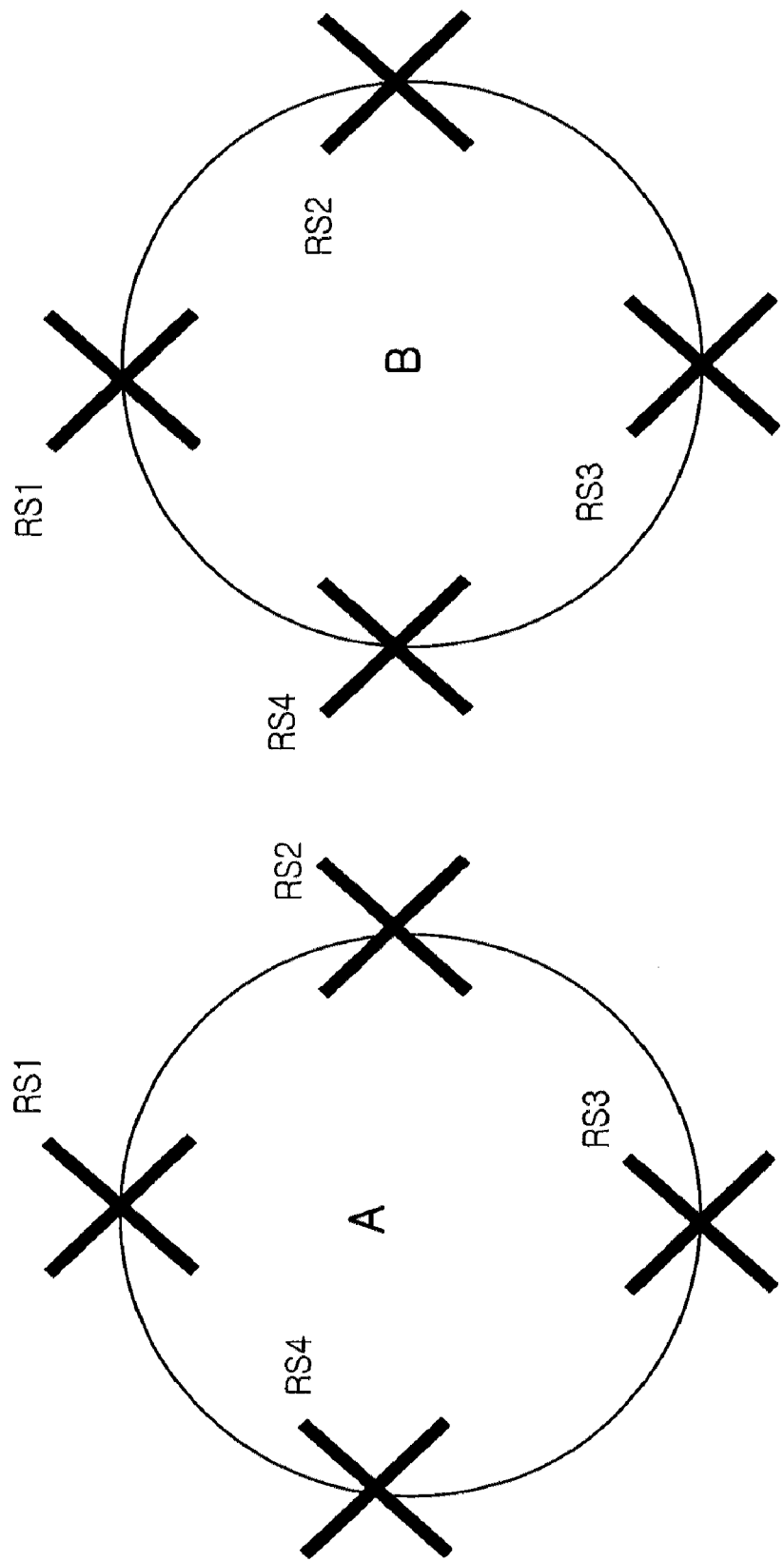
FIG. 14 is an illustration showing an example of common reference signals (RS) mapping for an eight-antenna uniform circular array with dual slat ±45 degree polarization constructed according to the principles of the present invention.

FIG. 14 shows the example of RS mapping for eight-antenna uniform circular array with dual slat ±45 degree polarization. Four sets of the antennas are evenly located at the periphery of a circle. Similar to FIG. 12, the mapping type A maps RSs to the antennas positioned with 45 degrees against a virtual vertical line in a clockwise direction while the mapping type B maps RSs to the antennas positioned with 45 degrees against a virtual vertical line in a counter clockwise direction.

Figure 15:
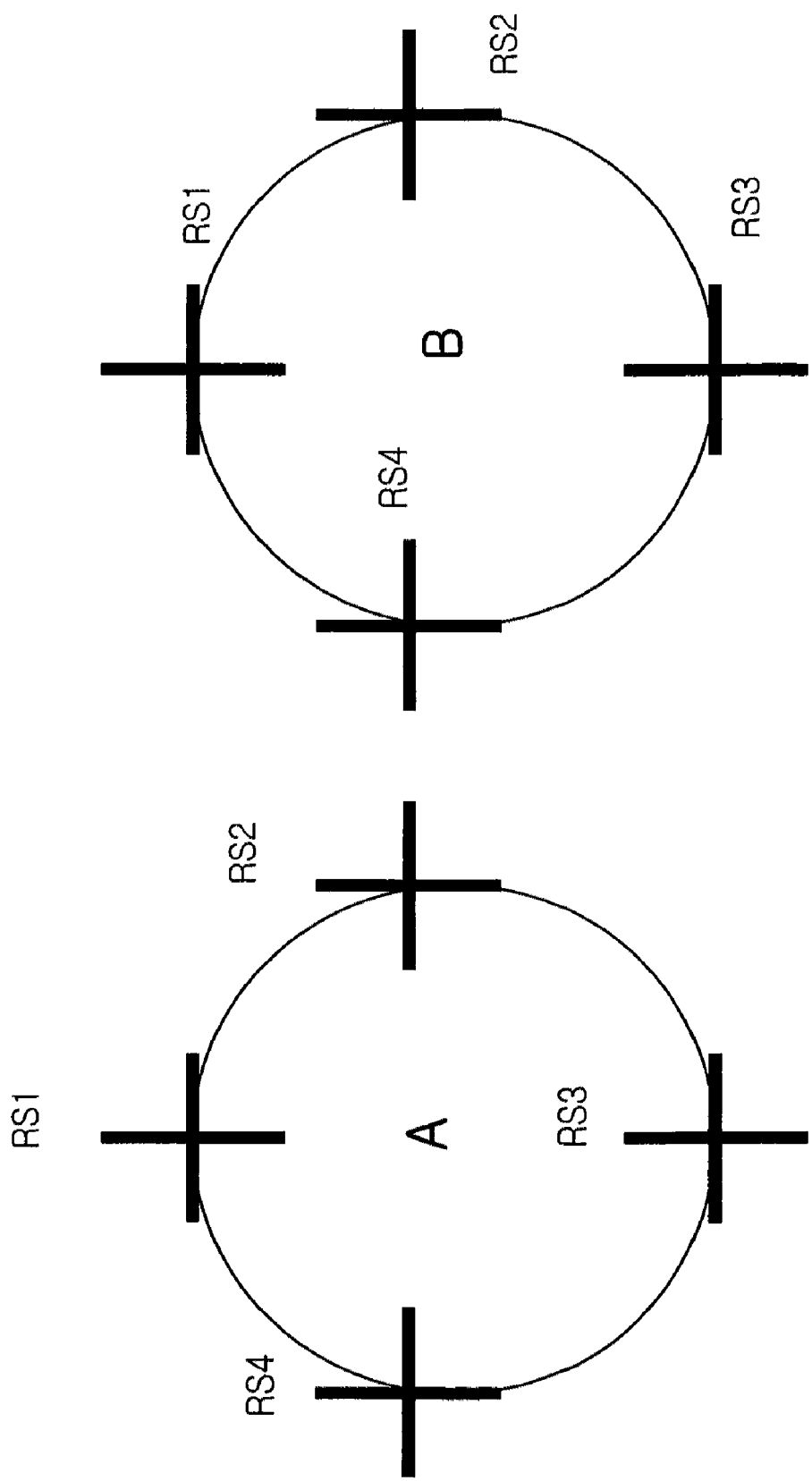
FIG. 15 is an illustration showing an example of common reference signals (RS) mapping for an eight-antenna uniform circular array with dual vertical/horizontal polarization constructed according to the principles of the present invention.

FIG. 15 shows the example of RS mapping for eight-antenna uniform circular array with dual vertical/horizontal polarization. Four sets of the antennas are evenly located at the periphery of a circle. Similar to FIG. 13, the mapping type A maps RSs to the antennas positioned aligned with the virtual vertical line while the mapping type B maps RSs to the antennas positioned perpendicularly to the virtual vertical line.

Antenna Beam Selection Algorithm for SU-CLTB

In this section, the antenna beam selection algorithm used in the proposed codebook-based SU-CLTB scheme will be discussed. The antenna selection processing at the receiver is based on the common pilot signal transmitted from a base station. The best antenna beam information is selected from the set of pre-determined antenna beam based on certain performance criteria maximum signal-to-noise ration (MSNR) or Minimum Mean Square Error (MMSE). In the case of noise-dominant environment, MSNR is used while in the presence of interference dominant environment, MMSE is employed.

For example, when MSNR is used, the transmit beamforming vector of the best antenna beam for the k'th subcarrier, $W_k$, may be selected, for type A RS mapping:

$$W_k = C_{j,max} \quad (8)$$

where $$C_{j,max} = \underset{j}{\mathrm{argmax}} \left\{ \sum_k \sum_{m=1}^M \sum_{p=1}^{\frac{P}{2}} w_p(\theta_j) \hat{H}_{p,m,k} \right\} \quad (9)$$

where $\hat{H}_{p,m,k}$ denotes the channel estimate for transmit antenna p, receive antenna m in the k'th subcarrier, P is and $w_p(\theta_j)$ is $w_p(\theta_j)$ is vectors of codeword of the codebook as shown in either equation (2) or (5) in dependence upon the RS mapping antenna configuration.

For type-B RS mapping, the beam selection algorithm should be modified to $$W_k = C_{j,max} \quad (10)$$

where $$C_{j,max} = \underset{j}{\mathrm{argmax}} \left\{ \sum_k \sum_{m=1}^M \sum_{p=1}^{\frac{P}{2}} w_{2p-1}(\theta_j) \hat{H}_{p,m,k} \right\} \quad (11)$$

where $\hat{H}_{p,m,k}$ denotes the channel estimate for transmit antenna p, receive antenna m in the k'th subcarrier, P is total number of transmit antenna, and P is and $w_p(\theta_j)$ is vectors of codeword of the codebook as shown in either equation (2) or (5) in dependence upon the RS mapping antenna configuration.

Additional Common Pilot

In one embodiment of the present invention, another four common reference signals (RS5, RS6, RS7, RS8) are added, in addition to the current common pilots RS1, RS2, RS3, RS4. These four common pilots are used for the four transmit antennas that are currently not associated with existing RS1, RS2, RS3, RS4. In addition, these additional common pilots may be sent in the downlink at a much lower frequency, for example, every 10 seconds, instead of the frequency of sending the existing common reference signals (i.e., the frequency may be every slot, in order of milliseconds, for example 1 ms-10 ms).

Figure 16:
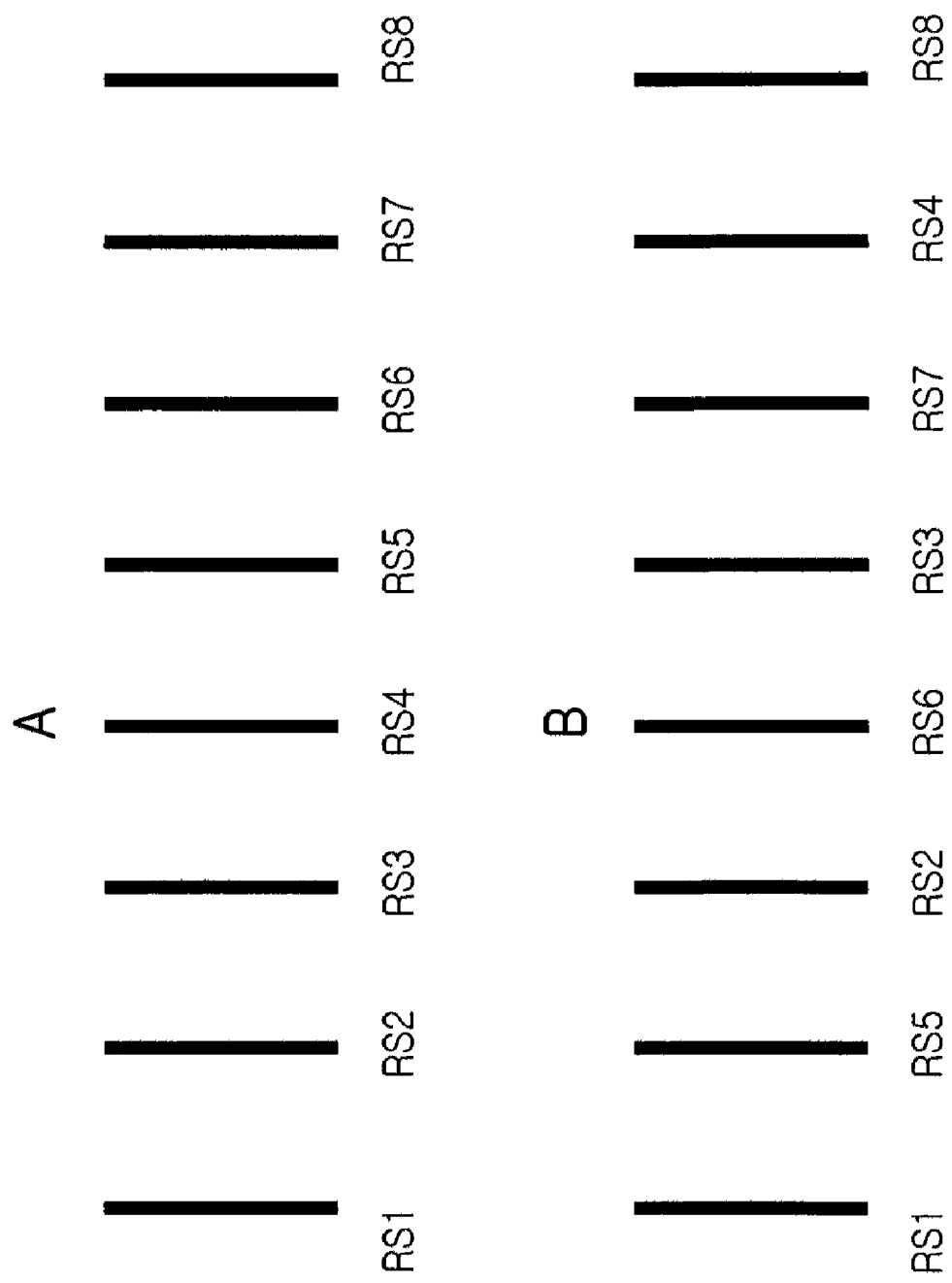
FIG. 16 is an illustration showing an example of common reference signals (RS) mapping for an eight-antenna single polarization ULA systems with additional common reference signals constructed according to the principles of the present invention.

FIG. 16 shows the RS mapping for eight-antenna single polarization ULA systems, with additional common reference signals (RS5, RS6, RS7, RS8). An example of type A RS mapping may be represented as follows:

RS1⇔ANT1;
RS2⇔ANT2;
RS3⇔ANT3;
RS4⇔ANT4;
RS5⇔ANT5;
RS6⇔ANT6;
RS7⇔ANT7; and
RS8⇔ANT8.

An example of type B RS mapping may be represented as follows:

RS1⇔ANT1;
RS5⇔ANT2;
RS2⇔ANT3;
RS6⇔ANT4;
RS3⇔ANT5;
RS7⇔ANT6;
RS4⇔ANT7; and
RS8⇔ANT8.

The mapping type A represents a case where RSs1-4 are sequentially mapped to a set of antennas and the set of antennas are neighboring to each other, and RSs5-8 are sequentially mapped to another set of antennas and the another antennas are neighboring to each other; mapping type B represents a case where RSs 1-4 are mapped to discrete antennas with at least one antenna mapped with one of RSs 5-8 in between except for the 1st antenna and last antenna in the line, and RSs 5-8 are mapped to discrete antennas with at least one antenna mapped with one of RSs1-4 in between except for the $1^{st}$ antenna and the last antenna in the line.

Figure 17:
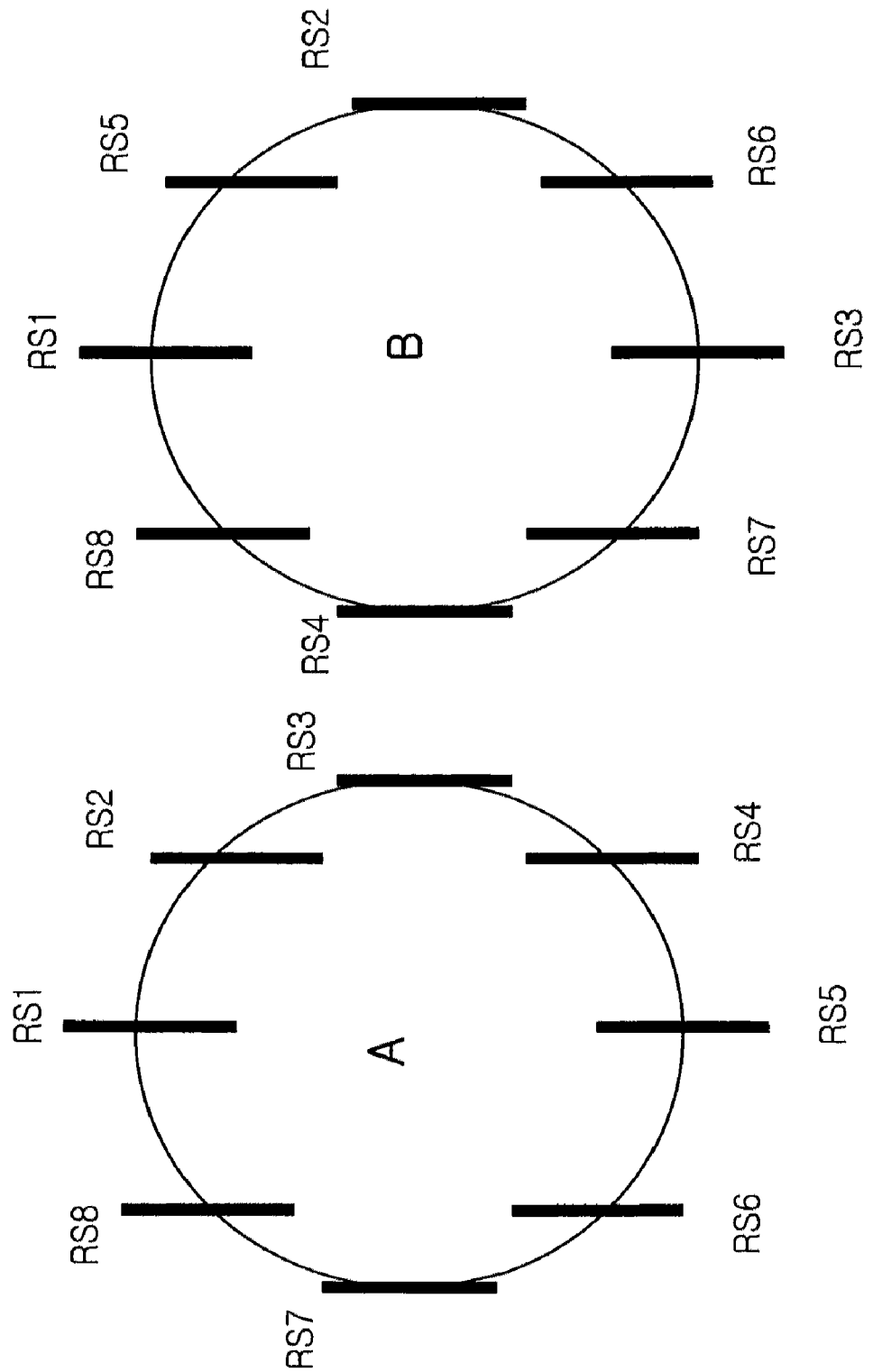
FIG. 17 is an illustration showing an example of common reference signals (RS) mapping for an eight-antenna single polarization UCA systems with additional common reference signals constructed according to the principles of the present invention.

FIG. 17 shows the RS mapping for eight-antenna single polarization for UCA systems, with additional common reference signals (RS5, RS6, RS7, RS8). Antennas are evenly positioned at the periphery of a circle and all of the antennas have an identical direction. Mapping type A sequentially maps RSs 1-4 to a set of neighboring antennas and maps RSs5-8 to another set of neighboring antennas. Mapping type B alternately maps one of RSs 1-4 and one of RSs 5-8 to the antennas. In other words, the neighboring antennas of one antenna mapped with RSs from RSs1-4 are mapped with RSs from RSs 5-8, and the neighboring antennas of one antenna mapped with RSs from RSs5-8 are mapped with RSs from RSs 1-4.

Figure 18:
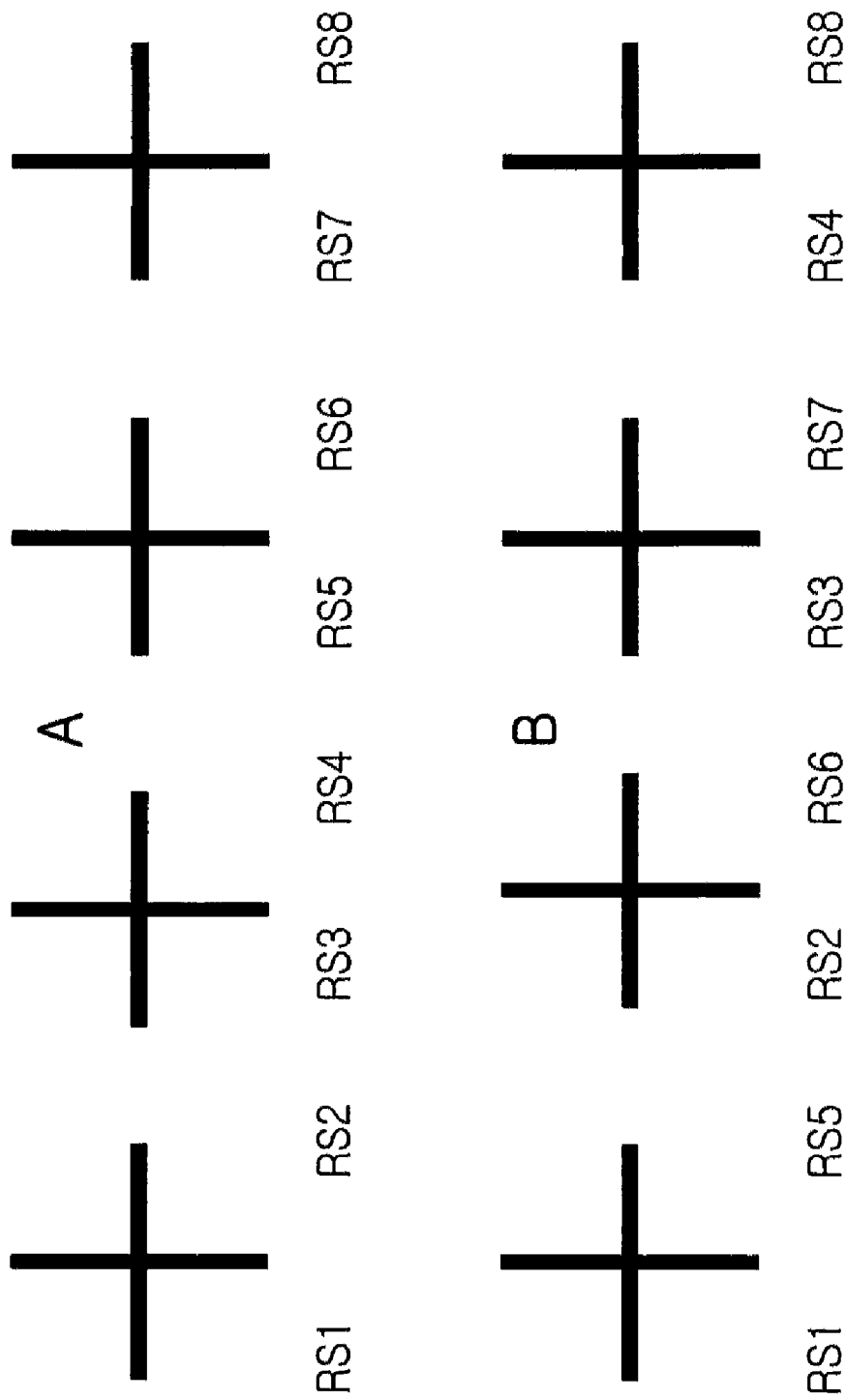
FIG. 18 is an illustration showing an example of common reference signals (RS) mapping for an eight-antenna dual vertical/horizontal polarization ULA systems with additional common reference signals constructed according to the principles of the present invention.

FIG. 18 shows the RS mapping for eight-antenna dual vertical polarization for ULA with additional common pilots (RS5, RS6, RS7, RS8). Eight antennas are arranged into four sets with each set having two antennas across each other. Mapping type A maps RSs 1-4 to two neighboring sets of antennas, and maps RSs 5-8 to another two neighboring sets of antennas. Mapping type B selects one of RSs 1-4 and one of RSs5-8 and maps them to antennas of each set respectively.

FIG. 19 shows the RS mapping for eight-antenna slat±45 degree polarization for ULA with additional common reference signals (RS5, RS6, RS7, RS8). Similar to FIG. 18, Mapping type A maps RSs 1-4 to two neighboring sets of antennas, and maps RSs 5-8 to another two neighboring sets of antennas. Mapping type B selects one of RSs 1-4 and one of RSs 5-8 and maps them to antennas of each set respectively.

Signaling Scheme for SU-CLTB

Based on the performance observed in the Annex section (to be discussed), the proposed SU-CLTB not only provides significant system gain over the baseline system (without transmit beamforming), but provides signaling overhead reduction. There are two method of reducing signaling overhead with the proposed SU-CLTB: feedback rate and feedback bandwidth. The feedback rate indicates the frequency of sending the feedback channel information to a base station. Generally speaking, the faster the feedback rate is, the larger the signaling overhead is. The feedback bandwidth is referred to how wide the bandwidth is required to feedback to a base station. Generally speaking, the larger the feedback bandwidth is, the smaller is the feedback overhead. As shown in the reference section, the feedback rate of the proposed SU-CLTB may be signaling at the order of seconds, instead of milliseconds in a typical system. This results in significant overhead reduction. With this feedback rate, the signaling can be done at higher Layer (slower) signaling. Additionally, the feedback bandwidth of the proposed SU-CLTB is equal to the whole system bandwidth, instead of bandwidth of sub-band or sub-carrier. Note that sub-carrier is the smallest bandwidth unit in OFDM systems, and sub-band is referred as a group of sub-carriers. Sub-band is regarded as partial system bandwidth. As compared to the prior art such as conventional open-loop transmit beamforming, the proposed SU-CLTB does not require phase calibration processing, which is generally costly and sensitive to radio channel variation. As compared to contemporary closed-loop beamforming, the proposed SU-CLTB provides a significant signaling overhead reduction and the codebook design of the SU-CLTB is less sensitive to radio channel variation.

In one embodiment of the present invention, the mobile station feedbacks only one choice of beamforming codeword of the codebook for the entire bandwidth, instead of every sub-band or every subcarrier. This results in significant saving of feedback bandwidth.

In another embodiment of the present invention, we propose to use higher layer signaling to transmit the feedback information of the choice of beamforming codeword of the codebook. The resulting feedback rate may be much smaller than the contemporary codebook based feedback scheme, where the feedback is carried on Physical layer signals.

CQI Reporting for SU-CLTB

As previously mentioned, two types of reference signals for transmit beamforming systems are typically needed in wireless communication system: common reference signals and dedicated reference signals. Common reference signals are for CQI (channel quality indication) reporting and codeword choice reporting, while dedicated reference signals are specific for data demodulation and detection when transmit beamforming is employed. In this section, CQI (channel quality indication) reporting is employed by the proposed SU-CLTB. Specifically, the number of common reference signal is less the number of transmit antennas. In this case, a δCQI is needed for CQI reporting due to the fact there is a CQI difference between CQI calculation based on dedicated signal and CQI calculation based on common reference signal. A sending rate of the CQI calculated by the dedicated signals is faster than a sending rate of the CQI calculated by the reference signals.

Figure 20:
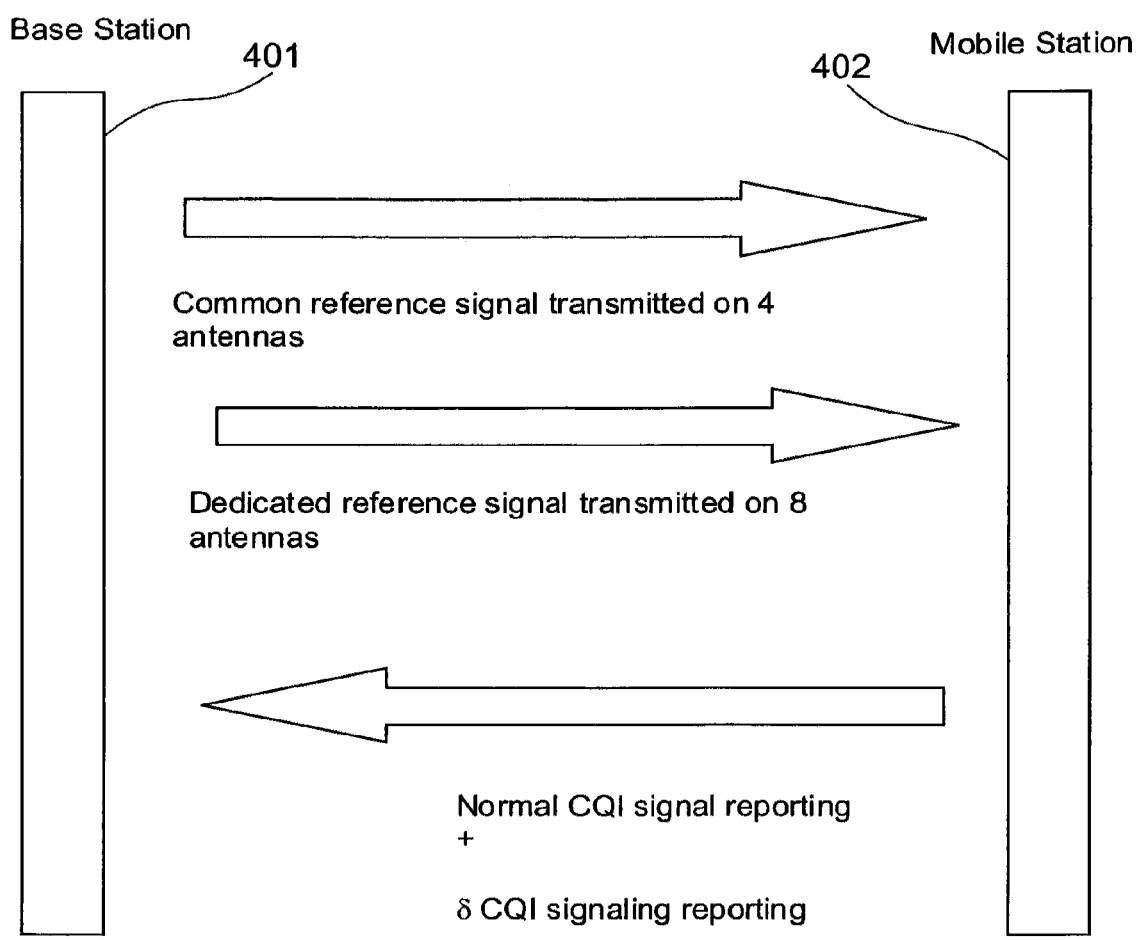
FIG. 20 is a diagram showing an example of CQI difference reporting for the SU-CLTB scheme constructed according to the principles of the present invention.

An example of δ CQI reporting for proposed SU-CLTB scheme is shown in FIG. 20. Based station 401 transmits to mobile station 402 common reference signals on four of transmitting antennas and transmits dedicated reference signals on eight of the transmitting antennas. The common reference signals are for CQI (channel quality indication) reporting and codeword choice reporting, while dedicated reference signals are specific for data demodulation and detection when transmit beamforming is employed. Mobile station 402 transmits back to base station 401 the normal CQI signal reporting based on common reference signals and δCQI which is the difference between CQI calculation based on dedicated signals and CQI calculation based on common reference signals.

In one embodiment of the current invention, a δ CQI reporting is proposed to report the channel estimation different between dedicated pilot and common pilot. This δ CQI reporting is in addition to the existing normal CQI reporting. Furthermore, the reporting frequency of the δ CQI may be different from the reporting frequency of the existing normal CQI.

Annex: Performance Result for SU-CLTB

In this section, system performances of the proposed SU-CLTB systems are presented by FIGS. 21-29 in order to show the improvement of the proposed SU-CLTB compare to the contemporary system.

Figure 21:
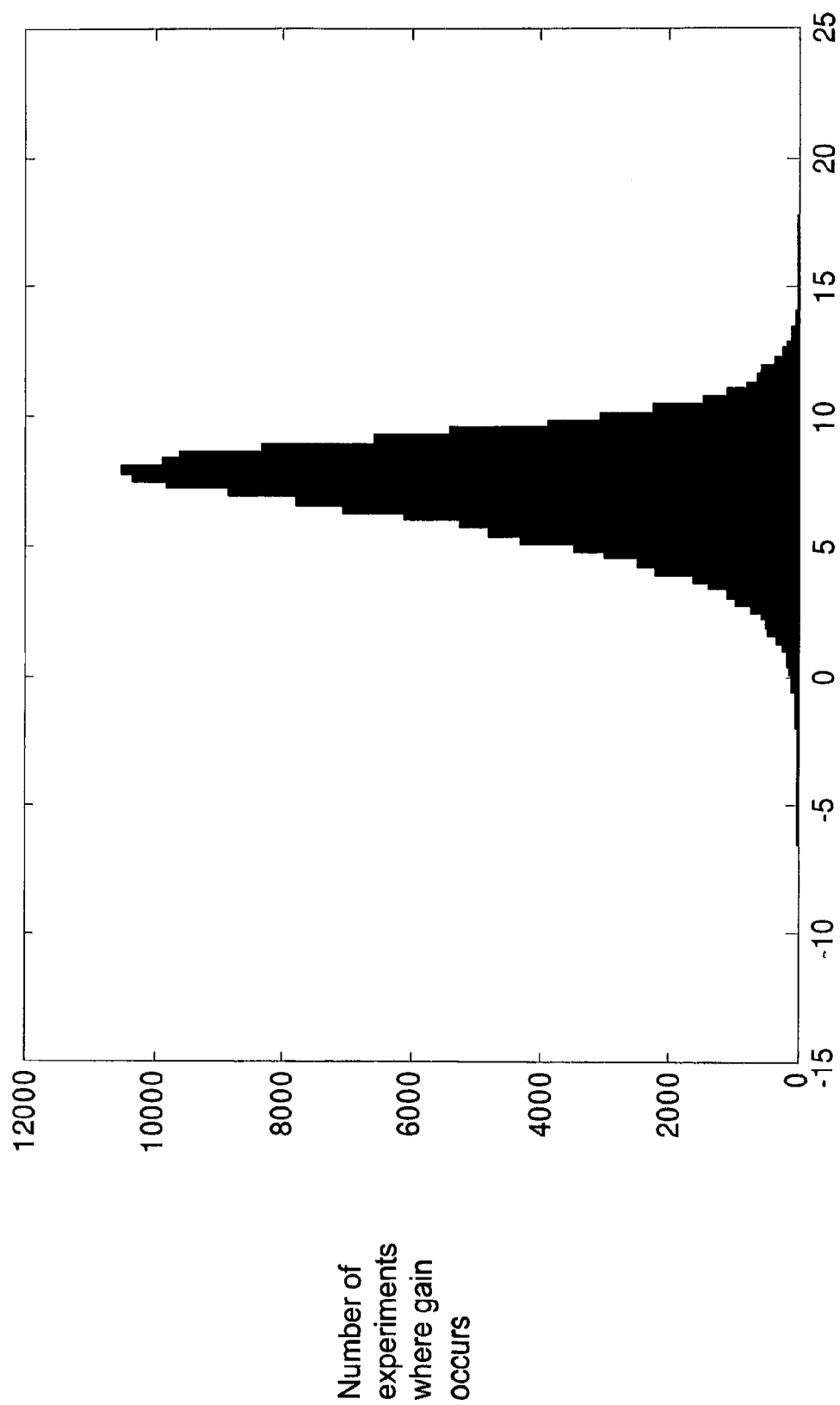
FIG. 21 is a histogram showing beamforming gain of the SU-CLTB over the baseline system with uniform linear array antennas configuration constructed according to the principles of the present invention.
Figure 22:
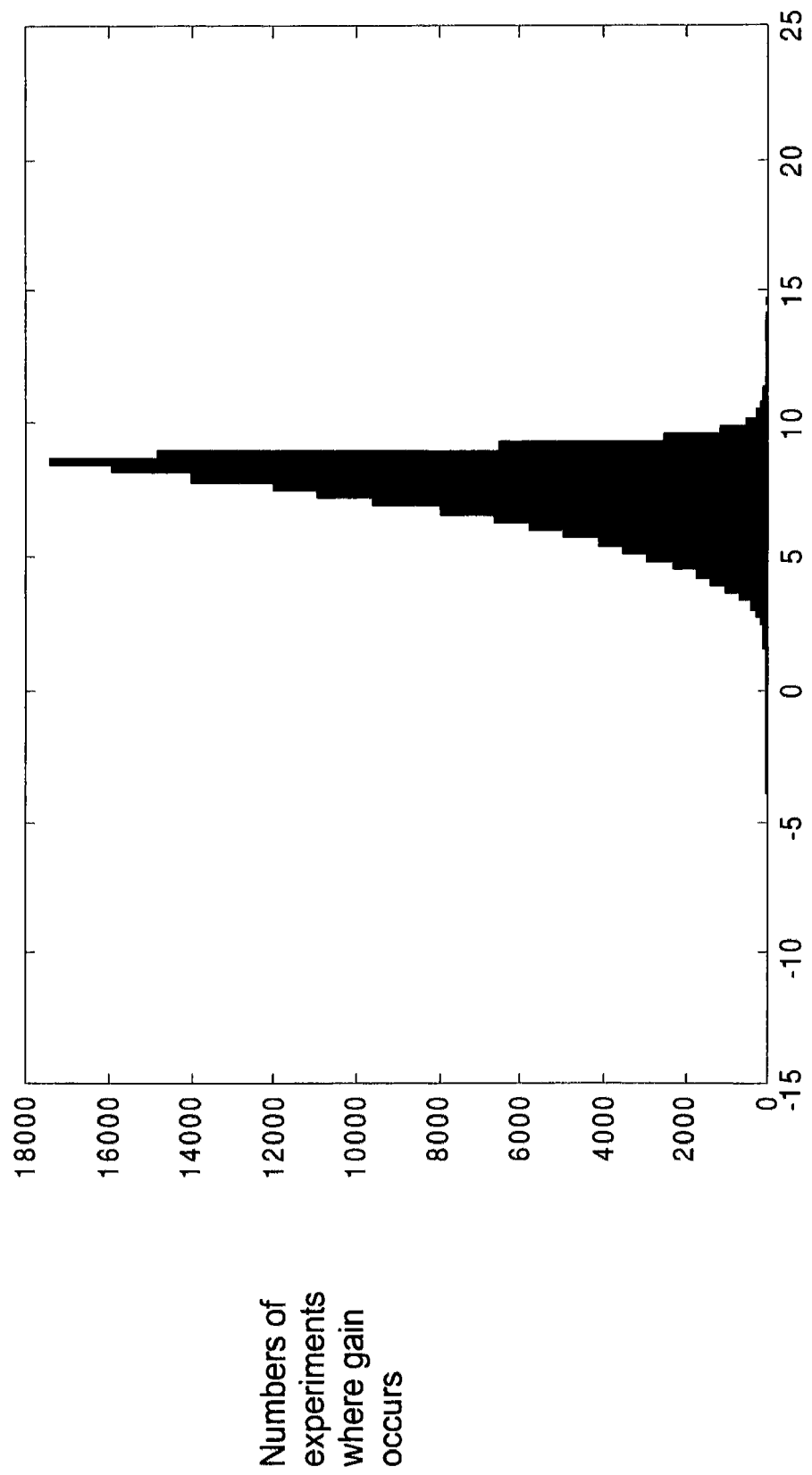
FIG. 22 is a histogram showing beamforming gain of the SU-CLTB over the baseline system with uniform circular array antennas configuration constructed according to the principles of the present invention.

FIG. 21 and FIG. 22 show the histogram of beamforming gain of the proposed SU-CLTB over the baseline system with uniform linear array (ULA) and uniform circular array (UCA), respectively. As shown, the proposed SU-CLTB significantly outperforms the baseline systems. It is noted that the baseline system is a single transmit antenna system. The baseline in the present invention refers to a contemporary system. The vertical axis of FIGS. 21 and 22 is probability density. That is, it basically shows the possibility of the occurrence of the gain in horizontal axis in the experiments. The results are based on 500,000 computer experiments, and thus the number in vertical axis refers to the times the gain in horizontal axis occurs. The gain at 0 db point represents the contemporary industry standard system (i.e. baseline system), which is a single transmit antenna system. It is clearly shown that the proposed SU-CLTB has better performance of SNR gain over the baseline system.

Figure 23:
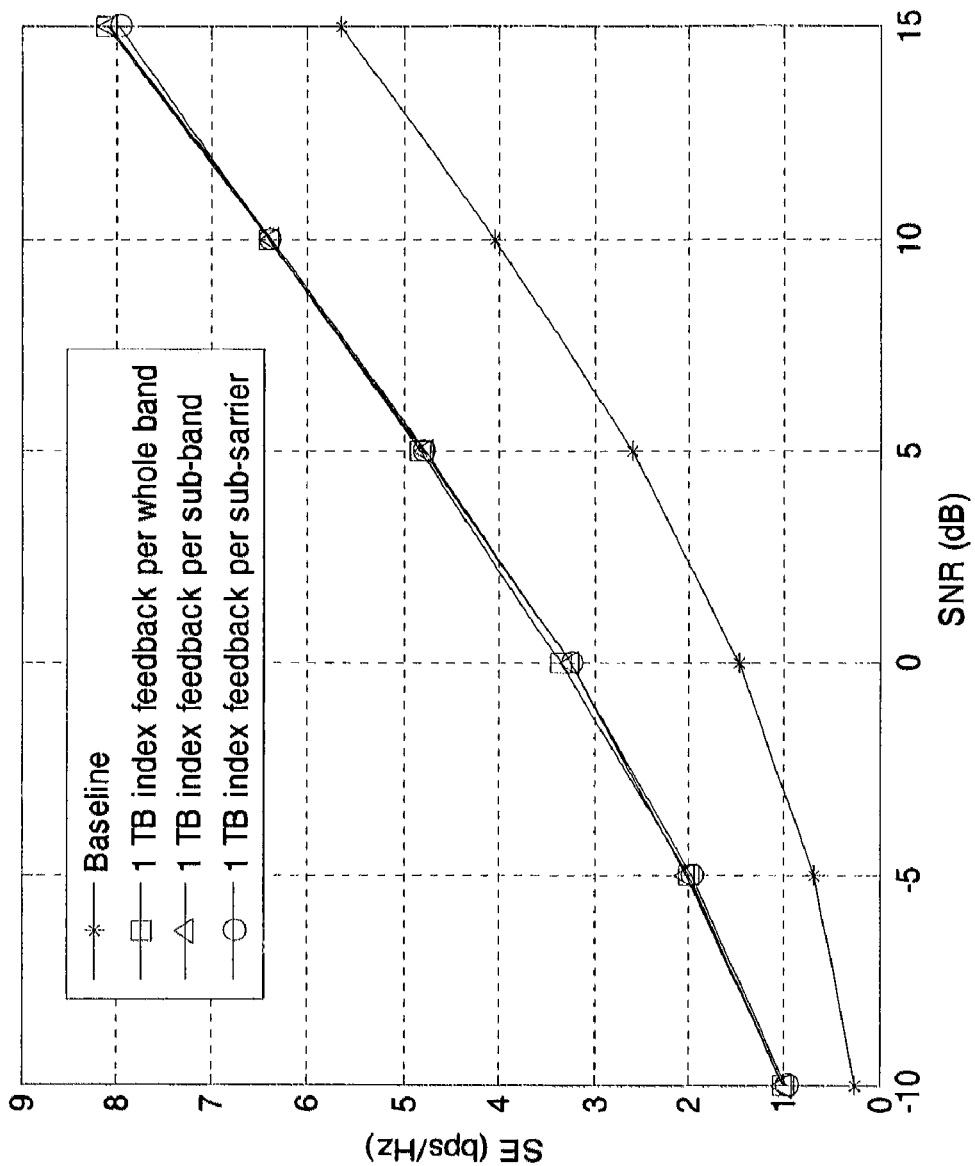
FIG. 23 is a two dimensional graph showing a spectral efficiency (SE) improvement of the SU-CLTB over the baseline system under various feedback bandwidths constructed according to the principles of the present invention.

FIG. 23 shows the spectral efficiency (SE) improvement of the proposed SU-CLTB over the baseline system under various feedback bandwidths. As shown, the proposed SU-CLTB provides substantial SE improvement over the baseline systems. For example, with same signal-noise-ratio 5 dB, the spectral efficiency of the baseline system is for example almost half of the proposed SU-CLTB. The curves representing the proposed SU-CLTB with different feedback bandwidths almost overlap with each other. Therefore, it indicates that there is almost no performance difference for various feedback bandwidths for the proposed SU-CLTB. As previously stated, the large feedback bandwidth is, the smaller signaling overhead is. This result suggests that the proposed SU-CLTB may feedback the best antenna beam per whole system bandwidth without sacrifice of performance of the system.

Figure 24:
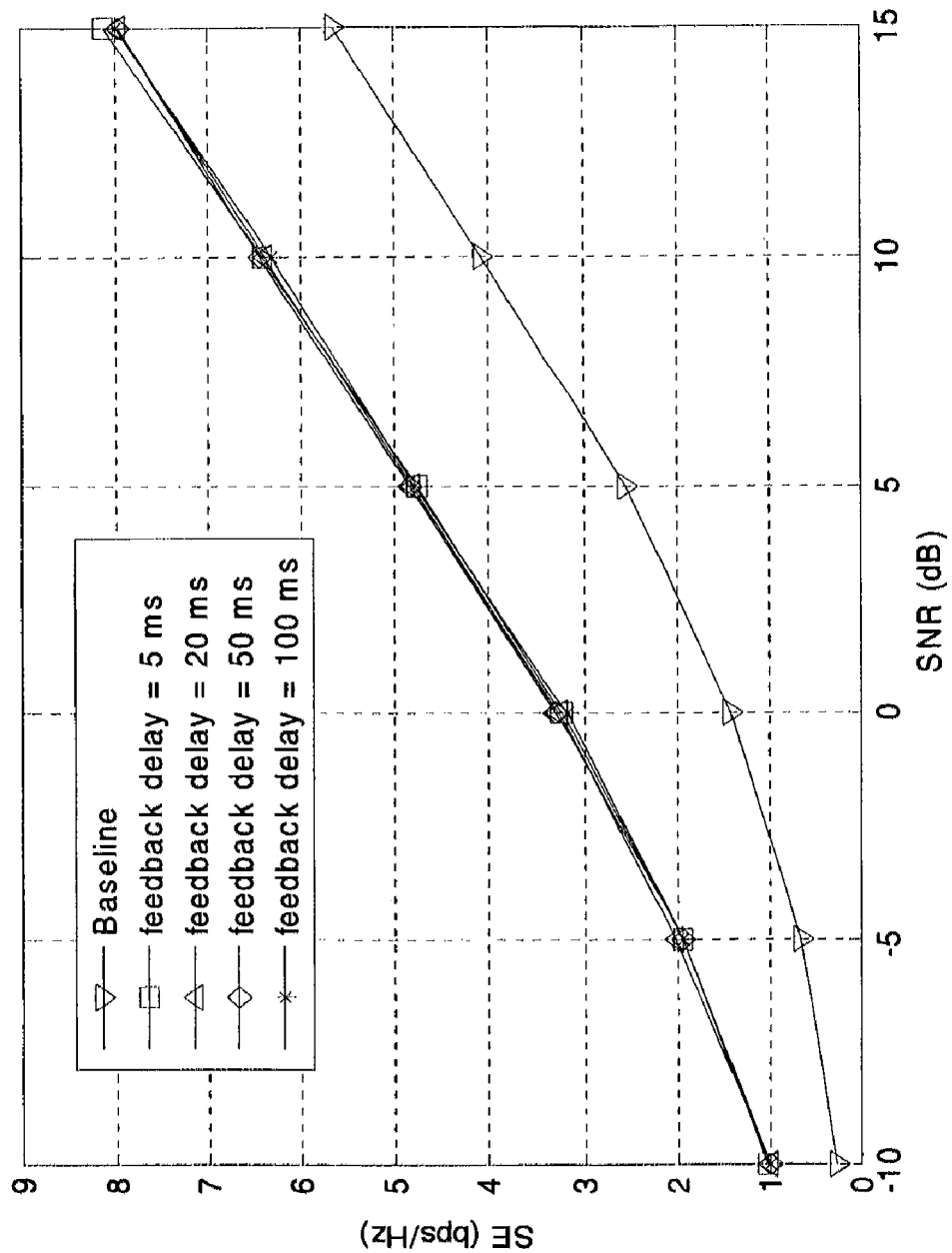
FIG. 24 is a two dimensional graph showing the spectral efficiency (SE) improvement of the SU-CLTB over the baseline system under various feedback rates constructed according to the principles of the present invention.

FIG. 24 shows the spectral efficiency (SE) improvement of the proposed SU-CLTB over the baseline system under various feedback rates. For example, at signal to noise ratio is 5 dB, the proposed SU-CLTB provides almost double spectral efficiency over the baseline systems. It is also shown that there is almost no performance difference for various feedback rates. As previously stated, the faster feedback bandwidth is, the larger signaling overhead is. This result suggests that the proposed SU-CLTB may feedback the best antenna beam at very slow feedback rate without sacrifice of performance of the system.

Figure 25:
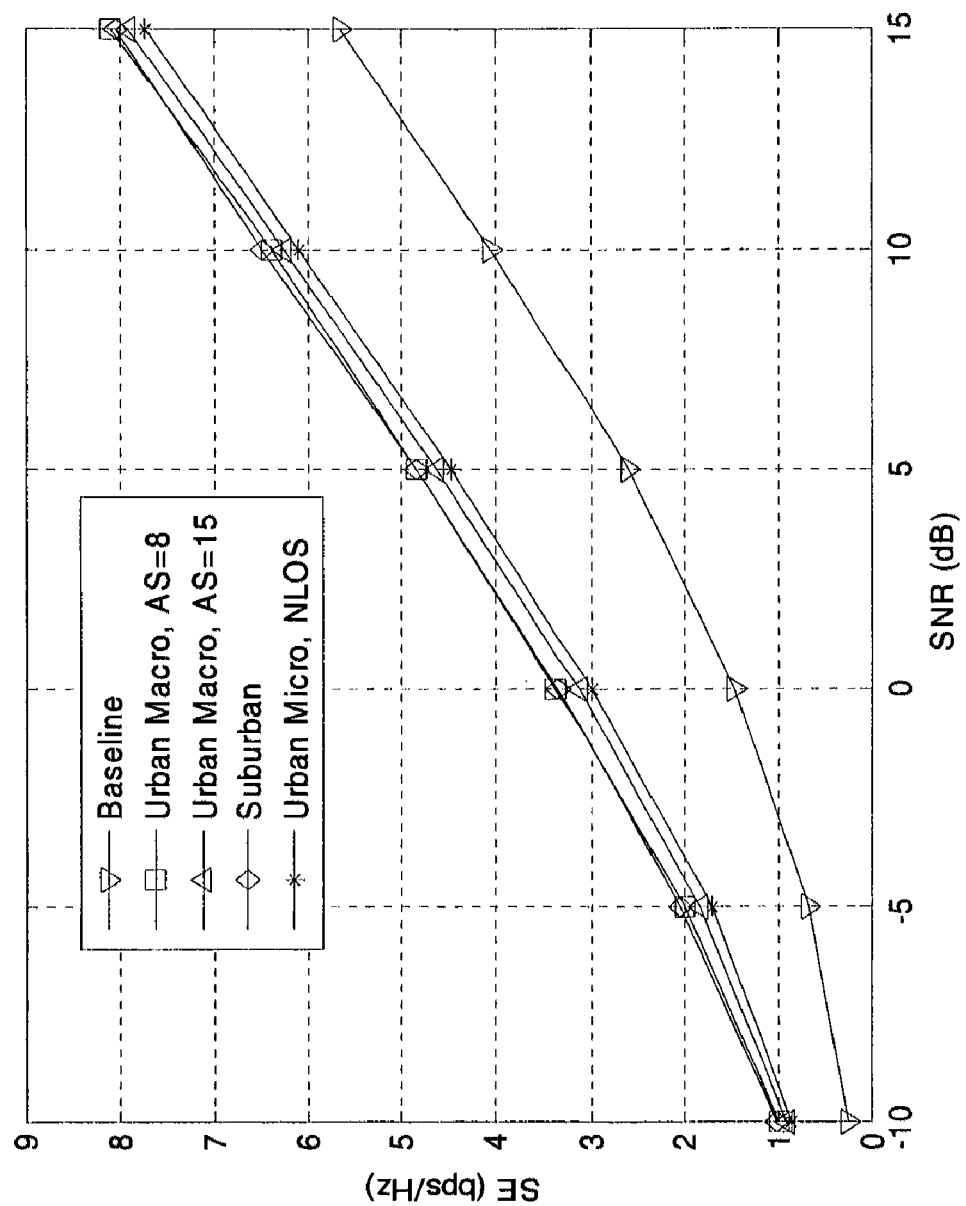
FIG. 25 is a two dimensional graph showing the spectral efficiency (SE) improvement of the SU-CLTB over the baseline system under various radio channel environments constructed according to the principles of the present invention.

FIG. 25 shows the spectral efficiency (SE) improvement of the proposed SU-CLTB over the baseline system under various radio channel environments such as urban macro cell channel, urban micro cell channel, and suburban channel. As shown, the proposed SU-CLTB provides large SE improvement over the baseline systems. It is also shown that there is not much performance difference for various radio channels. The result suggests that the proposed SU-CLTB is not sensitive to various radio environments.

Figure 26:
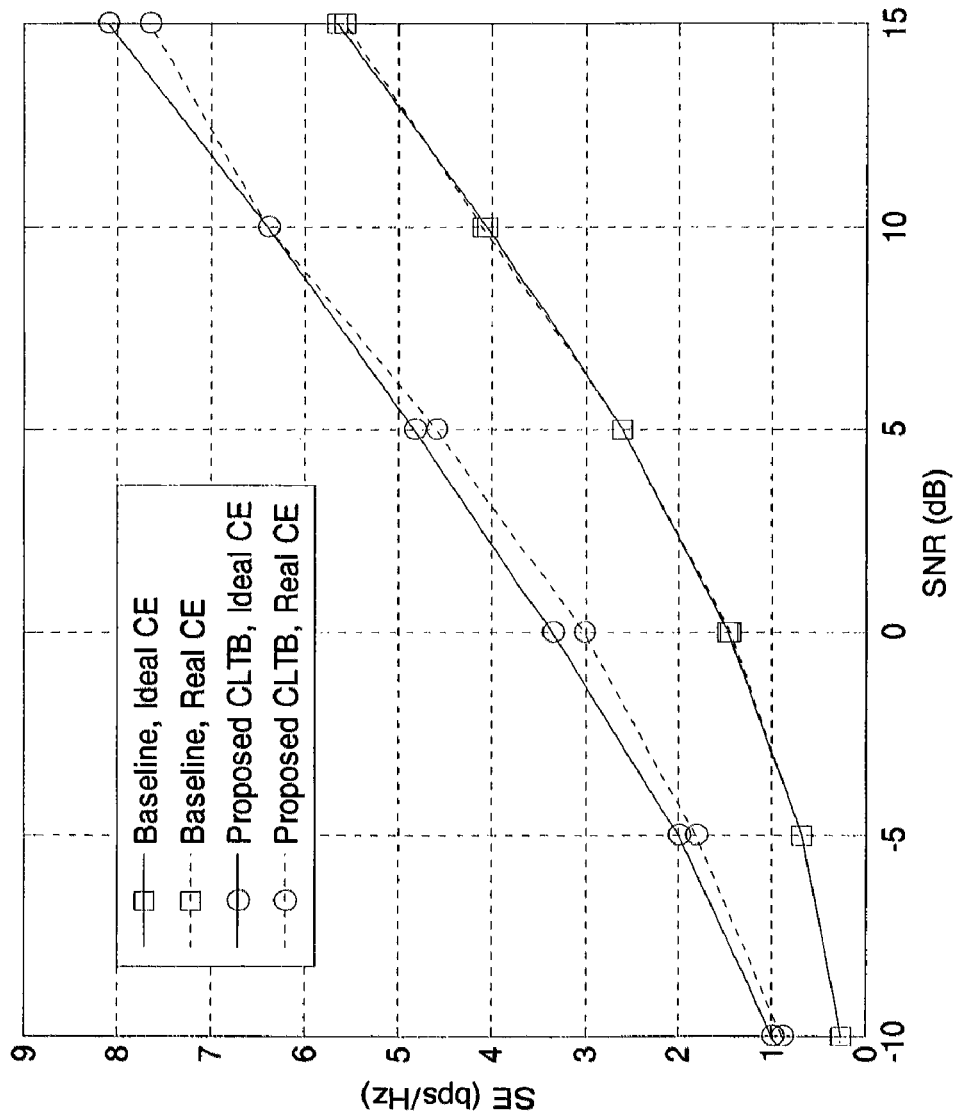
FIG. 26 is a two dimensional graph showing the spectral efficiency (SE) improvement of the SU-CLTB over the baseline system under realistic channel estimation (CE) constructed according to the principles of the present invention.

FIG. 26 shows the spectral efficiency (SE) improvement of the proposed SU-CLTB over the baseline system under realistic channel estimation (CE). As shown, the proposed SU-CLTB provides large SE improvement over the baseline systems in both of ideal and realistic channel estimations. The result suggests that the proposed SU-CLTB operation is not sensitive to realistic channel estimation error.

Figure 27:
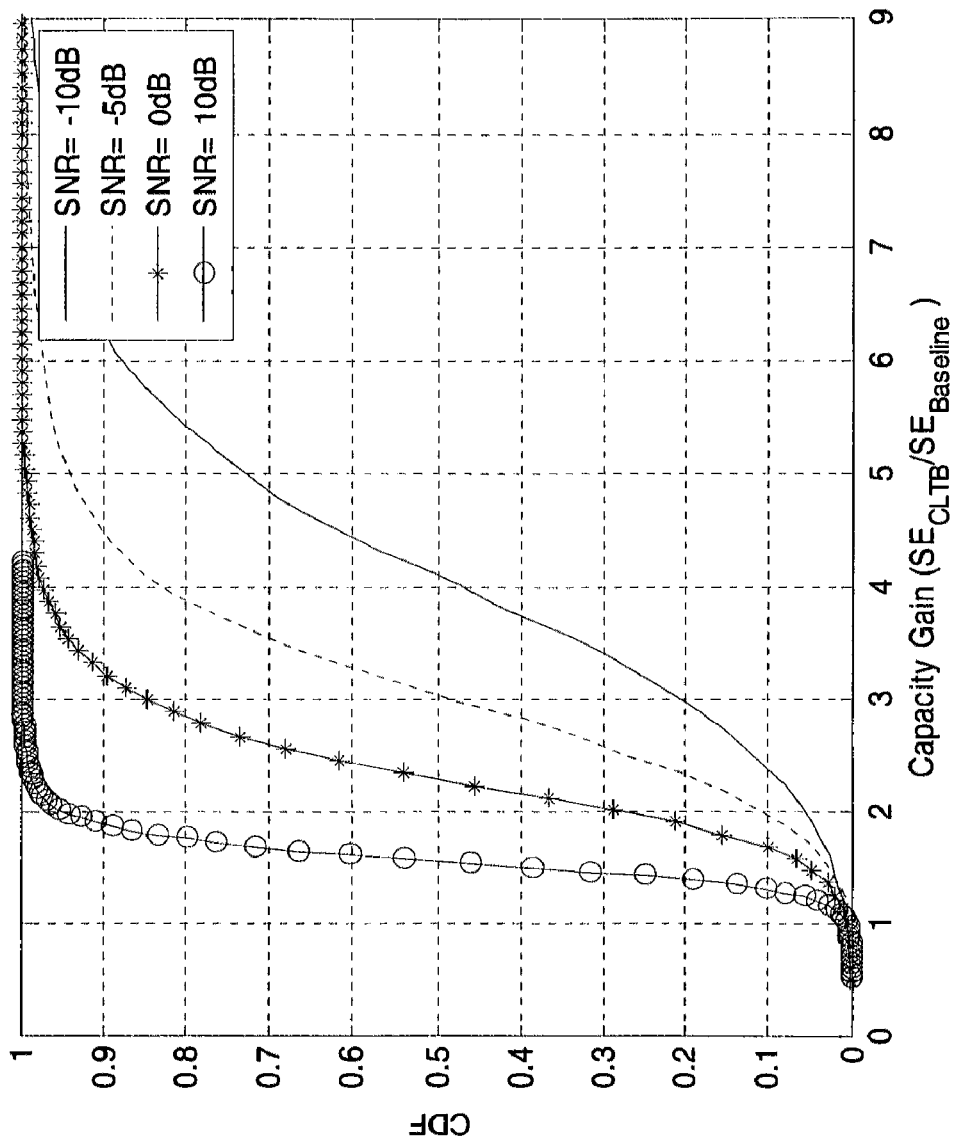
FIG. 27 is a two dimensional graph showing a CDF (Cumulative Distribution Function) of capacity gain of the SU-CLTB over the baseline system with uniform linear array (ULA) constructed according to the principles of the present invention.

FIG. 27 show the CDF (Cumulative Distribution Function) of capacity gain of the proposed SU-CLTB over the baseline system with uniform linear array (ULA) and uniform circular array (UCA), respectively. With same probability, the ratio of spectral efficiency (SE) of the proposed SU-CLTB over the baseline system is greater than one. The proposed SU-CLTB provides significant capacity gain over the baseline systems. And this means that spectral efficiency (SE) of the proposed SU-CLTB is significantly improved comparing to the baseline system. It is also noted that the capacity gain increases when signal-to-noise ratio (SNR) decreases. The result suggests that the proposed SU-CLTB may significantly improve system performance when SNR is low, which is typically occurs at the edge of the cell.

Figure 28:
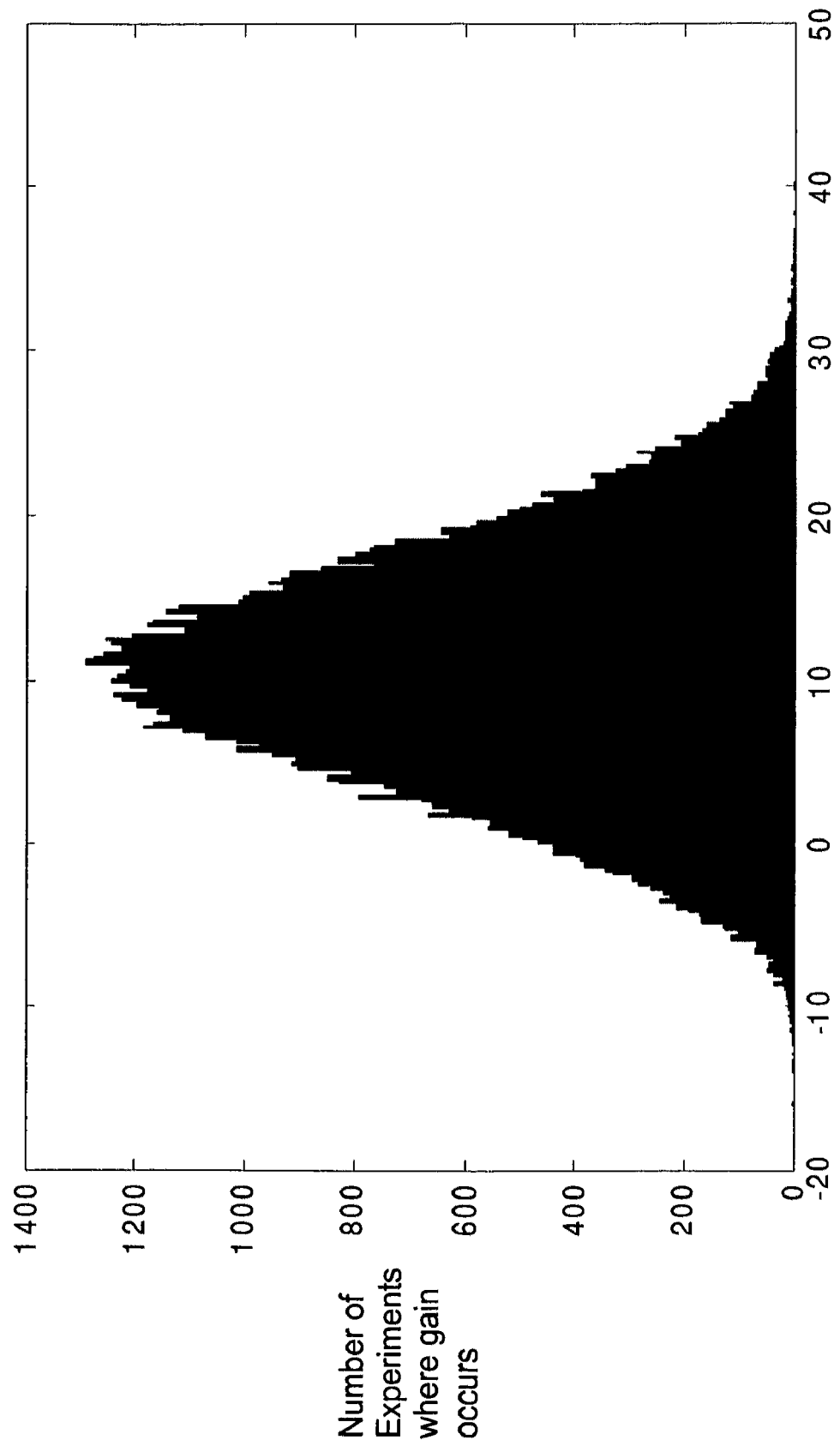
FIG. 28 is a histogram showing the SIR gain of the SU-CLTB over the baseline system with uniform circular array (UCA) constructed according to the principles of the present invention.

FIG. 28 show the SIR gain of the proposed SU-CLTB over the baseline system with uniform circular array (UCA). As shown, the proposed SU-CLTB provides significant SIR gain over the baseline systems. The vertical axis of FIG. 29 is probability density. That is, it basically shows the possibility of the occurrence of the gain in horizontal axis in the experiments. The results are based on 500,000 computer experiments, and thus the number in vertical axis refers to the times the gain in horizontal axis occurs. The gain at 0 db point represents the contemporary industry standard system (i.e. baseline system), which is a single transmit antenna system. It is clearly shown that the proposed SU-CLTB has better performance of SIR gain over the baseline system.

What is claimed is:

1. A method for transmitting data, the method comprising:
   broadcasting a plurality of antenna array response vectors of a codebook to a receiver, the response vectors generated according to a plurality of codewords of a codebook, the codebook based upon an antenna configuration comprising at least one of a uniform linear array (ULA) and a uniform circular array (UCA), an antenna spacing, and a number of antennas of a transmitter;
   optimizing a beamforming process by utilizing feedback information from the receiver, the feedback information comprising a selected codeword being selected at the receiver among the plurality of codewords within the codebook in dependence upon a predetermined performance criteria of a data communication system and in dependence upon reference messages broadcasted from the transmitter, wherein the broadcasted reference messages comprise channel information; and
   transmitting data signals by utilizing the optimized beamforming process.

2. The method of claim 1, wherein the response vectors and the data signals are carried by OFDM (Orthogonal Frequency Division Multiplexing) radio signals.

3. The method of claim 1, wherein a plurality of antenna beams are formed based on the antenna array response vectors of the transmitter and are carried on a broadcasting channel.

4. The method of claim 1, wherein the predetermined performance criteria of a data communication system is Signal-to-Noise ratio in a coverage limited system.

5. The method of claim 1, wherein the predetermined performance criteria of a data communication system is signal-to-interference gain in an interference limited system.

6. The method of claim 1, wherein the codebook design is based on the antenna configuration.

7. The method of claim 6, wherein a codeword $C_j$ of the codebook, for the uniform linear array antenna configuration, is defined by:

$$C_j = \begin{bmatrix} w_1(\theta_j) \\ w_2(\theta_j) \\ \vdots \\ w_p(\theta_j) \\ \vdots \\ w_P(\theta_j) \end{bmatrix} = \begin{bmatrix} 1 \\ e^{-j2\pi \frac{D}{\lambda} \sin(\theta_j)} \\ \vdots \\ e^{-j2\pi \frac{(p-1)D}{\lambda} \sin(\theta_j)} \\ \vdots \\ e^{-j2\pi \frac{(P-1)D}{\lambda} \sin(\theta_j)} \end{bmatrix}$$

where j=1, . . . ,J, J is a size of the codebook, p is an index (p=1, . . . , P) of transmitter antennas, P is a number of transmitter antennas, D is the antenna spacing $\lambda$=c/f_c is a wavelength of a carrier where c is the speed of light and f_c is a frequency of the carrier, $\theta_j$ is a main angle of a direction of departure of a j'th transmit antenna beam, and $w_p(\theta_j)$ are vectors of the codeword of the codebook and a j'th transmitter antenna.

8. The method of claim 7, wherein $\theta_j$ (j=1, . . . ,J,) is applied where a plurality of antenna beams from the transmitter antennas have uniform angular spacing.

9. The method of claim 8, wherein, within a three sector system where each sector has 120 degrees angular spacing,
   when a reference angle (i.e., zero degree direction) corresponds to an edge of one sector, the $\theta_j$ is defined by $$\theta_j = \left(j + \frac{1}{2}\right) \times \frac{120}{J} \text{ (degrees); and}$$

when the reference angle corresponds to a center of one sector, the $\theta_j$ is defined by $$\theta_j = \left(j + \frac{1}{2}\right) \times \frac{120}{J} - 60 \text{ (degrees).}$$

10. The method of claim 7, wherein $\theta_j$ (j=1, . . . ,J,) is applied where a plurality of antenna beams from the transmitter antennas have a nonuniform angular spacing.

11. The method of claim 6, wherein the codeword $C_j$ of the codebook, for the uniform circular array antenna configuration, is defined by:

$$C_j = \begin{bmatrix} w_1(\theta_j) \\ w_2(\theta_j) \\ \vdots \\ w_p(\theta_j) \\ \vdots \\ w_P(\theta_j) \end{bmatrix} = \begin{bmatrix} e^{-j2\pi \frac{R}{\lambda} \sin(\zeta)\cos(\theta_j - \varphi_1)} \\ e^{-j2\pi \frac{R}{\lambda} \sin(\zeta)\cos(\theta_j - \varphi_2)} \\ \vdots \\ e^{-j2\pi \frac{R}{\lambda} \sin(\zeta)\cos(\theta_j - \varphi_p)} \\ \vdots \\ e^{-j2\pi \frac{R}{\lambda} \sin(\zeta)\cos(\theta_j - \varphi_P)} \end{bmatrix}$$

where j=1, . . . ,J, R is a radius of the uniform circular array, $\xi$ is an elevation angle, $\theta_j$ is a main angle of departure direction of the j'th transmitting antenna, $w_p(\theta_j)$ are vectors of the codeword of the codebook, and $\xi$ equals to 90 degrees when only azimuth angles are considered in a propagation geometry.

12. The method of claim 11, wherein $\theta_j$ (j=1,...,J,) is applied where a plurality of antenna beams from the transmitter antennas have uniform angular spacing.

13. The method of claim 12, wherein, within a three sector system where each sector has 120 degrees angular spacing, when a reference angle (zero degree direction) corresponds to an edge of one sector, the $\theta_j$ is defined by $$\theta_j = \left(j + \frac{1}{2}\right) \times \frac{120}{J} \text{ (degrees); and}$$

when the reference angle corresponds to a center of one sector, the $\theta_j$ is defined by $$\theta_j = \left(j + \frac{1}{2}\right) \times \frac{120}{J} - 60 \text{ (degrees)}.$$

14. The method of claim 12, wherein the uniform linear array is deployed in sectorized cell and the uniform circular array is used in an omni-directional cell.

15. The method of claim 11, wherein the codebook employs a space between the transmitter antennas equal to half of a wavelength of a carrier.

16. The method of claim 11, wherein $\theta_j$ (j=1,...,J,) is applied where a plurality of antenna beams from the transmitter antennas have nonuniform angular spacing.

17. The method of claim 6, wherein the response vectors are mapped to the transmitter antennas.

18. The method of claim 17, wherein the uniform linear array comprises a single polarized uniform linear antenna array including antennas sequentially arranged in a linear array, wherein either a first set of response vectors are sequentially mapped to a set of antennas neighboring to each other (mapping type A) or the first set of response vectors are mapped to discrete antennas with at least one antenna of a free state located in between except for a first antenna and a last antenna in the single polarized uniform linear antenna array (mapping type B).

19. The method of claim 17, wherein the uniform circular array comprises a single polarized uniform circular antenna array including antennas sequentially arranged at a periphery of a circular array, wherein either a first set of response vectors are mapped to a set of discrete antennas disposed either perpendicular to or overlapped with a diameter of the single polarized uniform circular antenna array (mapping type A) or the first set of response vectors are mapped to a set of discrete antennas positioned with a predetermined angle against the diameter of the single polarized uniform circular antenna array (mapping type B).

20. The method of claim 17, wherein the uniform linear array comprises a dual slat ±45 degree polarized uniform linear antenna array having sets of antennas sequentially arranged in the linear antenna array, wherein each set of antennas includes two antennas across each from other and antennas in each set are positioned 45 degrees in a clockwise direction or a counterclockwise direction against a virtual vertical line, wherein either a first set of response vectors are mapped to antennas positioned with 45 degrees against the virtual vertical line in the clockwise direction (mapping type A) or the first set of response vectors are mapped to antennas positioned with 45 degrees against the virtual vertical line in the counterclockwise direction (mapping type B).

21. The method of claim 17, wherein the uniform linear array comprises a dual vertical/horizontal polarized uniform linear antenna array including sets of antennas are sequentially arranged in the linear antenna array, wherein each set of antennas includes two antennas across from each other and antennas in each set are positioned perpendicular to and aligned to a virtual vertical line, wherein either a first set of response vectors are mapped to antennas aligned with the virtual vertical line (mapping type A) or the first set of response vectors are mapped to antennas positioned perpendicularly to the virtual vertical line (mapping type B).

22. The method of claim 17, wherein the uniform circular array comprises a dual slat ±45 degree polarized uniform circular antenna array including sets of antennas sequentially arranged at a periphery of the circular antenna array, wherein each set of antennas includes two antennas across from each other and antennas in each set are positioned 45 degrees in a clockwise direction or a counterclockwise direction against a virtual vertical line, wherein either a first set of response vectors are mapped to antennas positioned with 45 degrees against the virtual vertical line in a clockwise direction (mapping type A) or the first set of response vectors are mapped to antennas positioned with 45 degrees against a virtual vertical line in a counterclockwise direction (mapping type B).

23. The method of claim 17, wherein the uniform circular array comprises a dual vertical/horizontal polarized uniform circular antenna array including sets of antennas sequentially arranged at a periphery of the circular antenna array, wherein each set of antennas includes two antennas across from each other and antennas in each set are positioned perpendicular to and aligned to a virtual vertical line, wherein either a first set of response vectors are mapped to antennas positioned aligned with the virtual vertical line mapping type A) or the first set of response vectors are mapped to antennas positioned perpendicularly to the virtual vertical line (mapping type B).

24. The method of claim 17, wherein a second set of response vectors are transmitted at a lower frequency relative to a transmission frequency of a first set of response vectors, and wherein the second set of response vectors are mapped to antennas not associated with the first set of response vectors.

25. The method of claim 24, wherein the uniform linear array comprises a single polarized uniform linear antenna array, wherein either the first set of response vectors are sequentially mapped to a set of antennas neighboring each other and the second set of response vectors are sequentially mapped to another set of antennas neighboring each other (mapping type A), or the first set of response vectors are mapped to discrete antennas with at least one antenna mapped to one of the second set of response vectors in between except for a first antenna and a last antenna in the single polarized uniform linear antenna array, and the second set of the response vectors are mapped to discrete antennas with at least one antenna mapped to one of the first set of the response vectors in between except for the first antenna and the last antenna in the single polarized uniform linear antenna array (mapping type B).

26. The method of claim 24, wherein the uniform circular array comprises a single polarized uniform circular antenna array, wherein either the first set of the response vectors are sequentially mapped to a set of consistent antennas and the second set of response vectors are mapped to another set of consistent antennas (mapping type A) or one of the first set of response vectors and one of the second set of response vectors are alternately mapped to sequential antennas arranged at a periphery of the single polarized uniform circular antenna array (mapping type B).

27. The method of claim 24, wherein the uniform circular array comprises a dual vertical/horizontal polarized uniform circular array, wherein either the first set of response vectors are mapped to neighboring antennas sets each including two antennas across from each other and the second set of response vectors are mapped to other neighboring antenna sets each including two antennas across each other (mapping type A), or one of the first set of response vectors and one of the second set of response vectors are mapped to two antennas across each from other (mapping type B).

28. The method of claim 24, wherein the uniform circular array comprises a dual slat ±45 degree polarization uniform linear antenna array wherein either the first set of response vectors are mapped to neighboring antenna sets each including two antennas across from each other and the second set of response vectors are mapped to other neighboring antennas sets each including two antennas across from each other (mapping type A), or one of the first set of response vectors and one of the second set of response vectors are mapped to two antennas across from each other (mapping type B).

29. The method of claim 1, wherein the feedback information from the receiver includes a single codeword for an entire bandwidth of the data communication system.

30. The method of claim 1, wherein the feedback information is transmitted through system layers higher than a Physical layer.

31. The method of claim 1, further comprising broadcasting dedicated response vectors different from the response vectors broadcasted to the receiver.

32. The method of claim 31, wherein a difference between channel quality indication (CQI) calculated by the dedicated signals and CQI calculated by the response vectors is reported to the transmitter.

33. The method of claim 31, wherein a sending rate of the channel quality information (CQI) calculated by the dedicated signals is faster than a sending rate of CQI calculated by the response vectors.

34. A transmitter, comprising:
a transmitting processor configured to perform a Orthogonal Frequency Division Multiplexing transmission;
a plurality of antennas configured to broadcast a plurality of antenna array response vectors of a codebook to a receiver, the response vectors generated according to a plurality of codewords of a codebook, the codebook based upon an antenna configuration comprising at least one of a uniform linear array (ULA) and a uniform circular array (UCA), an antenna spacing and a number of antennas of a transmitter; and
a beamformer configured to form an antenna beam utilizing feedback information from the receiver, the feedback information comprising a codeword selected at the receiver from among a plurality of codewords within a codebook known to the receiver in dependence upon a predetermined performance criteria of a data communication system and in dependence upon the response vectors.

35. A method for receiving data, the method comprising:
receiving a plurality of antenna array response vectors generated according to a plurality of codewords of a codebook, the codebook based upon an antenna configuration comprising at least one of a uniform linear array (ULA) and a uniform circular array (UCA), an antenna spacing and a number of antennas of a transmitter;
selecting a codeword from among the plurality of codewords within the codebook in dependence upon a predetermined performance criteria of a data communication system and in dependence upon the received response vectors;
receiving and processing data signals in dependence upon the selected codeword within the codebook; and
feedbacking to the transmitter information comprising the codeword selected by the receiver.

36. The method of claim 35, wherein the predetermined performance criteria of the data communication system is selected from maximum signal-to-noise ratio (MSNR) and Minimum Mean Square Error (MMSE).

37. The method of claim 36, wherein a codeword $C_j$ of the codebook, for the uniform linear array antenna configuration, is defined by:

$$C_j = \begin{bmatrix} w_1(\theta_j) \\ w_2(\theta_j) \\ \vdots \\ w_p(\theta_j) \\ \vdots \\ w_P(\theta_j) \end{bmatrix} = \begin{bmatrix} 1 \\ e^{-j2\pi \frac{D}{\lambda}\sin(\theta_j)} \\ \vdots \\ e^{-j2\pi \frac{(p-1)D}{\lambda}\sin(\theta_j)} \\ \vdots \\ e^{-j2\pi \frac{(P-1)D}{\lambda}\sin(\theta_j)} \end{bmatrix},$$

where j=1, ... ,J, J is a size of the codebook, p is an index of transmitter antennas (p=1, ... , P), P is a number of transmitter antennas, D is a space between the transmitter antennas, $\lambda$=c/f_c is a wavelength of a carrier where c is the speed of light and f_c is a frequency of the carrier, $\theta_j$ is an angle of departure direction of a j'th transmit antenna beam, and $w_p(\theta_j)$ are vectors of a codeword of the codebook and a j'th transmitting antenna, and wherein, for the uniform circular array antenna configuration, the codeword $C_j$ of the codebook is defined by:

$$C_j = \begin{bmatrix} w_1(\theta_j) \\ w_2(\theta_j) \\ \vdots \\ w_p(\theta_j) \\ \vdots \\ w_P(\theta_j) \end{bmatrix} = \begin{bmatrix} e^{-j2\pi \frac{R}{\lambda}\sin(\zeta)\cos(\theta_j-\varphi_1)} \\ e^{-j2\pi \frac{R}{\lambda}\sin(\zeta)\cos(\theta_j-\varphi_2)} \\ \vdots \\ e^{-j2\pi \frac{R}{\lambda}\sin(\zeta)\cos(\theta_j-\varphi_p)} \\ \vdots \\ e^{-j2\pi \frac{R}{\lambda}\sin(\zeta)\cos(\theta_j-\varphi_P)} \end{bmatrix},$$

where j=1, ... ,J, R is a radius of the uniform circular array, $\xi$ is an elevation angle, $\theta_j$ is a main angle of departure direction of the j'th transmitting antenna beam, $w_p(\theta_j)$ is are vectors of the codeword of the codebook, $\xi$ and equals to 90 degrees when only azimuth angles are considered in a propagation geometry.

38. The method of claim 37, wherein a beamforming vector of a selected antenna beam is dependent upon mapping types of mapping between the response vectors and transmitting antennas of a transmitter.

39. The method of claim 38, wherein, when maximum signal-to-noise ratio (MSNR) is the predetermined performance criteria of the data communication system, a transmit beamforming vector $W_k$ of the selected antenna beam for a k'th subcarrier is selected, for a mapping type A of mapping between the response vectors and the transmitting antennas, by:

$$W_k = C_{j,max}$$

where $$C_{j,max} = \underset{j}{\operatorname{argmax}}\left\{\sum_k \sum_{m=1}^{M} \sum_{p=1}^{\frac{P}{2}} w_p(\theta_j)\hat{H}_{p,m,k}\right\},$$

where $\hat{H}_{p,m,k}$ is a channel estimate for transmit antenna p and receive antenna m in the k'th subcarrier, and $w_p(\theta_j)$ is a vector of a codeword of the codebook and is selected based on the antenna configuration, wherein the transmit beamforming vector $W_k$ of the selected antenna beam for k'th subcarrier is selected, for a mapping type B of mapping between the response vectors and the transmitting antennas, by:

$$W_k = C_{j,max}$$

where $$C_{j,max} = \underset{j}{\operatorname{argmax}}\left\{\sum_k \sum_{m=1}^{M} \sum_{p=1}^{\frac{P}{2}} w_{2p-1}(\theta_j)\hat{H}_{p,m,k}\right\},$$

where $\hat{H}_{p,m,k}$ denotes the channel estimate for transmit antenna p and receive antenna m in the k'th subcarrier, and $w_p(\theta_j)$ is the vector of the codeword of the codebook and is selected according to the antenna configuration.

40. The method of claim 39, wherein the uniform linear array comprises a single polarized uniform linear transmitting antenna array including antennas sequentially arranged in a linear array, wherein the mapping type A sequentially maps a first set of response vectors to a set of transmitting antennas neighboring to each other and the mapping type B maps the first set of response vectors to discrete antennas with at least one transmitting antenna of a free state located in between except for a first transmitting antenna and a last transmitting antenna in the single polarized uniform linear transmitting antenna array.

41. The method of claim 39, wherein the uniform circular array comprising a single polarized uniform circular transmitting antenna array including antennas sequentially arranged at a periphery of a circular array, wherein the mapping type A maps the first set of response vectors to a set of discrete transmitting antennas disposed either perpendicular to or overlapped with a diameter of the single polarized uniform circular transmitting antenna array and the mapping type B maps the first set of response vectors to a set of discrete transmitting antennas positioned with a predetermined angle against the diameter of the single polarized uniform circular transmitting antenna array.

42. The method of claim 39, wherein the uniform linear array comprising a dual slat ±45 degree polarized uniform linear transmitting antenna array including sets of antennas sequentially arranged in the linear antenna array, wherein each set of antennas includes two antennas across from each other and antennas in each set are positioned 45degrees in a clockwise direction and a counterclockwise direction against a virtual vertical line, wherein the mapping type A maps a first set of response vectors to transmitting antennas positioned with 45 degrees against a virtual vertical line in a clockwise direction and the mapping type B maps the first set of response vectors to transmitting antennas positioned with 45 degrees against the virtual vertical line in a counterclockwise direction.

43. The method of claim 39, wherein the uniform linear array comprises a dual vertical/horizontal polarized uniform linear transmitting antenna array including sets of antennas sequentially arranged in the linear antenna array, wherein each set of antennas includes two antennas across from each other and antennas in each set are positioned perpendicular to and aligned to a virtual vertical line, wherein the mapping type A maps a first set of response vectors to transmitting antennas aligned with the virtual vertical line and the mapping type B maps the first set of response vectors to transmitting antennas positioned perpendicularly to the virtual vertical line.

44. The method of claim 39, wherein the uniform circular array comprises a dual slat ±45 degree polarized uniform circular transmitting antenna array including sets of antennas sequentially arranged at a periphery of the circular antenna array, wherein each set of antennas includes two antennas across from each other and antennas in each set are positioned 45 degrees in a clockwise direction and a counterclockwise direction against a virtual vertical line, wherein the mapping type A maps a first set of response vectors to transmitting antennas positioned with 45 degrees against the virtual vertical line in a clockwise direction and the mapping type B maps the first set of response vectors to transmitting antennas positioned with 45 degrees against a virtual vertical line in a counterclockwise direction.

45. The method of claim 39, wherein the uniform circular array comprises a dual vertical/horizontal polarized uniform circular transmitting antenna array including sets of antennas sequentially arranged at a periphery of the circular antenna array, wherein each set of antennas includes two antennas across from each other and antennas in each set are positioned perpendicularly to and aligned to the virtual vertical line, wherein the mapping type A maps a first set of response vectors to transmitting antennas aligned with the virtual vertical line and the mapping type B maps the first set of response vectors to transmitting antennas positioned perpendicularly to the virtual vertical line.

46. The method of claim 39, wherein a second set of response vectors is sent at a lower frequency relative to a transmission frequency of a first set of response vectors, and the second set of response vectors is mapped to antennas associated with the first set of response vectors.

47. The method of claim 46, wherein the uniform linear array comprises a single polarized uniform linear transmitting antenna array, wherein the mapping type A sequentially maps the first set of response vectors to a set of transmitting antennas neighboring to each other and sequentially maps the second set of reference signals to another set of transmitting antennas neighboring each other, wherein a sending rate of the second set of response vectors is lower than a sending rate of the first set of response vectors, and wherein the mapping type B maps the first set of response vectors to discrete transmitting antennas with at least one transmitting antenna mapped to one of the second set of response vectors in between except for a first transmitting antenna and a last transmitting antenna in the single polarized uniform linear transmitting antenna array, and maps the second set of the response vectors to discrete transmitting antennas with at least one transmitting antenna mapped with one of the first set of the response vectors in between except for the first transmitting antenna and the last transmitting antenna in the single polarized uniform linear transmitting antenna array.

48. The method of claim 46, wherein the uniform circular array comprises a single polarized uniform circular antenna array, wherein the mapping type A sequentially maps the first set of the response vectors to a set of consistent antennas and maps the second set of response vectors to another set of consistent antennas and the mapping type B alternately maps one of the first set of response vectors and one of the second set of response vectors to sequential antennas arranged at a periphery of the single polarized uniform circular antenna array.

49. The method of claim 46, wherein the uniform circular array comprises a dual vertical/horizontal polarized uniform circular array, wherein the mapping type A maps the first set of response vectors to neighboring antennas sets each having two antennas across from each other and maps the second set of response vectors to other neighboring antenna sets each having two antennas across each other, and wherein the mapping type B maps one of the first set of response vectors and one of the second set of response vectors to two antennas across from each other.

50. The method of claim 46, wherein the uniform linear array comprises a dual slat ±45 degree polarization uniform linear antenna array, with wherein the mapping type A maps the first set of response vectors to neighboring antenna sets each having two antennas across each other and maps the second set of response vectors to other neighboring antennas sets each having two antennas across each other, and the mapping type B maps one of the first set of response vectors and one of the second set of response vectors to two antennas across each other.

51. The method of claim 35, wherein the feedback information includes a single choice of beamforming codeword of the codebook for an entire bandwidth of the data communication system.

52. The method of claim 35, wherein the feedback information is transmitted through system layers higher than a Physical layer.

53. The method of claim 35, further comprising:
reporting to the transmitter a difference between channel quality indication (CQI) calculated by dedicated signals and CQI calculated by the response vectors, wherein the dedicated signals and the response vectors are broadcast from the transmitter.

54. The method of claim 53, wherein a sending rate of the CQI calculated by the dedicated signals is faster than a sending rate of the CQI calculated by the response vectors.

55. A receiver, comprising:
a plurality of receiving antennas configured to receive a plurality of antenna array response vectors of a codebook to a receiver, the response vectors generated according to a plurality of codewords of a codebook, the codebook based upon an antenna configuration comprising at least one of a uniform linear array (ULA) and a uniform circular array (UCA), an antenna spacing and a number of antennas of a transmitter;
an antenna beam selector configured to select a codeword among the plurality of codewords within the codebook in dependence upon a predetermined performance criteria of a data communication system and independence upon the broadcasted response vectors, and to feed back information comprising the codeword selected by the receiver; and
a receiving processor configured to perform an Orthogonal Frequency Division Multiplexing reception in dependence upon the selected codeword within the codebook.

56. A method of data communication, comprising:
broadcasting, at a transmitter, a plurality of antenna array response vectors of a codebook to a receiver, the response vectors generated according to a plurality of codewords of a codebook, the codebook based upon an antenna configuration comprising at least one of a uniform linear array (ULA) and a uniform circular array (UCA), an antenna spacing and a number of antennas of the transmitter, and the response vectors;
receiving, at the receiver, the broadcasted response vectors;
selecting, at the receiver, an codeword among the plurality of codewords within the codebook in dependence upon a predetermined performance criteria of a data communication system and in dependence upon the received broadcasted response vectors;
feedbacking to the transmitter, at the receiver, information comprising the codeword selected by the receiver;
selecting, at the transmitter, a beamforming process based upon the feedback information from the receiver;
transmitting, at the transmitter, data signals by utilizing the selected beamforming process; and
receiving and processing, at the receiver, the data signals in dependence upon the selected codeword within the codebook.

* * * * *